US012260260B1

(12) United States Patent
Gorman et al.

(10) Patent No.: US 12,260,260 B1
(45) Date of Patent: Mar. 25, 2025

(54) DIGITAL DELEGATE COMPUTER SYSTEM ARCHITECTURE FOR IMPROVED MULTI-AGENT LARGE LANGUAGE MODEL (LLM) IMPLEMENTATIONS

(71) Applicant: The Travelers Indemnity Company, Hartford, CT (US)

(72) Inventors: Matthew J. Gorman, Burlington, CT (US); Vincent E. Haines, East Point, GA (US); Girish A. Modgil, Alpharetta, GA (US); Brad E. Gawron, Porter Corners, NY (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 18/622,721

(22) Filed: Mar. 29, 2024

(51) Int. Cl.
*G06F 9/50* (2006.01)
*G06F 9/46* (2006.01)
*G06F 9/48* (2006.01)

(52) U.S. Cl.
CPC ............ *G06F 9/5066* (2013.01); *G06F 9/468* (2013.01); *G06F 9/4881* (2013.01); *G06F 2209/485* (2013.01); *G06F 2209/5017* (2013.01); *G06F 2209/506* (2013.01)

(58) Field of Classification Search
None
See application file for complete search history.

(56) References Cited

U.S. PATENT DOCUMENTS

| | | | |
|---|---|---|---|
| 11,640,823 B1* | 5/2023 | Pemberton | G10L 13/08 704/260 |
| 11,928,426 B1* | 3/2024 | Gutzeit | G06F 16/35 |
| 2024/0146734 A1* | 5/2024 | Southgate | G06F 21/6227 |
| 2024/0202225 A1* | 6/2024 | Siebel | G06F 40/40 |
| 2024/0202460 A1* | 6/2024 | Schillace | G06F 40/40 |
| 2024/0346388 A1* | 10/2024 | Wilczynski | G06N 20/20 |

OTHER PUBLICATIONS

Ding, Tinghe. "MobileAgent: enhancing mobile control via human-machine interaction and SOP integration." arXiv preprint arXiv: 2401.04124 (2024). (Year: 2024).*
Website: https://epam-rail.com/platform; download date Jun. 6, 2024; 2 pps.

* cited by examiner

*Primary Examiner* — Frank D Mills
(74) *Attorney, Agent, or Firm* — RowanTree Law Group, PLLC; Carson C. K.. Fincham

(57) ABSTRACT

Systems, apparatus, methods, and articles of manufacture for digital delegate computer system architecture that provides for improved multi-agent LLM implementations.

14 Claims, 10 Drawing Sheets

US 12,260,260 B1

DIGITAL DELEGATE COMPUTER SYSTEM ARCHITECTURE FOR IMPROVED MULTI-AGENT LARGE LANGUAGE MODEL (LLM) IMPLEMENTATIONS

BACKGROUND

The technology required to successfully implement Artificial Intelligence (AI) in consumer and/or forward-facing solutions and tools has been significantly advanced in recent years, leading to a dramatic increase in the number and type of AI implementations. As access to these AI tools has increased, the tasks that users feed into AI models have become increasingly complex and detailed. Models leveraging AI, such as Large Language Model (LLM) programs that are trained on vast amounts of textual data and are able to recognize and generate text, are typically not capable, however, of processing complex requests.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Some attempts have been made to provide for more flexible or powerful Large Language Model (LLM) programs that may be capable of handling more complex tasks. One such attempt is MetaGPT (https://arxiv.org/abs/2308.00352; https://github.com/geekan/MetaGPT) that implements a system of Standardized Operating Procedures (SOPs) into prompt sequences to help make multi-agent analysis more efficient. Another attempt is Autogen (https://github.com/microsoft/autogen) that provides a framework for multi-agent conversations that permits multiple agents to solve tasks together. The most prominent commercially available multi-agent solution is MS CoPilot™ (formerly Bing® Chat) that leverages a chatbot interface to preprocess inputs prior to sending to the LLM (GPT-4™ available from OpenAI of San Francisco, CA) for processing, available from the Microsoft Corporation of Redmond, WA. While each of these products is an advancement over single-LLM processing, each is limited in effectiveness by a specific set of input rules (e.g., SOP requirements) that must be carefully adhered to in order for the multi-tier processing to achieve a desirable result (e.g., a result free of Artificial Intelligence (AI) hallucinations).

In accordance with embodiments herein, these and other deficiencies of existing systems are remedied by providing systems, apparatus, methods, and articles of manufacture for a digital delegate computer system architecture that provides for improved multi-agent LLM implementations. In some embodiments, for example, a primary LLM agent and/or model may include and/or work with an identity server (e.g., a security, authorization, and/or authentication system, layer, and/or module) to provide user-specific access to a suite of secondary LLM agents and/or models. According to some embodiments, the system may be programmed to: (i) accept user identification and prompt data, (ii) identify (e.g., based on the user identification data) one or more entitlements (e.g., authorizations and/or authentications) assigned to the user, (iii) develop a multi-tier plan for resolving the prompt provided by the user (e.g., the plan defining a plurality of actions), (iv) identify a subset of available LLM tools (e.g., secondary LLM agents and/or models) that correspond to the user entitlement(s) and are capable of accomplishing the desired actions, (v) execute the plan by calling the subset of LLM tools, (vi) construct a user response based on results obtained from each secondary LLM agent/model, and/or (vii) forward or transmit the user response to the user, all as described herein. In such a manner, for example, the primary LLM agent/model may be specifically trained to segment user requests (e.g., the prompt), determine an appropriate secondary LLM agent/model suite that is suited for accomplishing individual actions within the plan, and executing the plan to return a desirable result to the user.

II. Digital Delegate Multi-Agent LLM Systems

Figure 1:
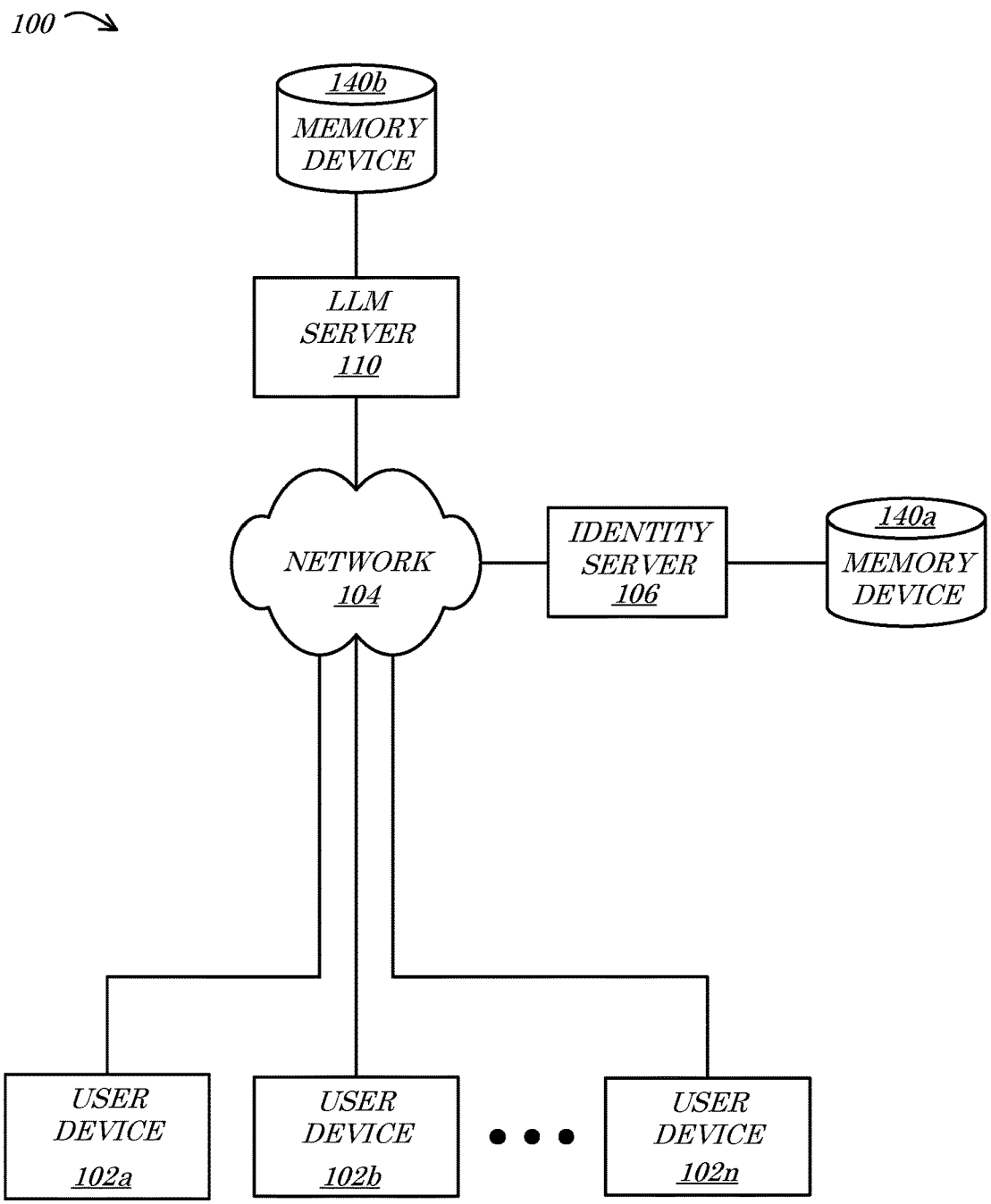
FIG. 1 is a block diagram of a system according to some embodiments.

Referring first to FIG. 1, a block diagram of a system 100 according to some embodiments is shown. In some embodiments, the system 100 may comprise a plurality of user devices 102*a-n*, a network 104, an identity server 106, and/or an LLM server 110. According to some embodiments, any or all of the components 102*a-n*, 104, 106, 110 may comprise and/or be in communication with one or more data storage and/or memory devices 140*a-b*. The identity server 106 may comprise and/or be in direct communication with a first memory device 140*a*, for example, and/or the LLM server 110 may comprise and/or be in direct communication with a second memory device 140*b*. As depicted in FIG. 1, any or all of the components 102*a-n*, 104, 106, 110, 140*a-b* (or any combinations thereof) may be in communication via the network 104. In some embodiments, communications between and/or within the components 102*a-n*, 104, 106, 110, 140*a-b* of the system 100 may be utilized to provide a digital delegate computer system architecture that provides for improved multi-agent LLM implementations. The LLM server 110 may, for example, interface with one or more of the user devices 102*a-n* by, e.g., receiving an LLM prompt and developing (e.g., automatically) a multi-tier LLM plan for responding to the LLM prompt. According to some embodiments, the system 100 may define a digital delegate system by utilizing the identity server 106 (and/or the first memory device 140*a*) to identify user-based entitlements and to selectively implement LLM tools to resolve the multi-tier plan, e.g., based on the entitlements.

Fewer or more components 102*a-n*, 104, 106, 110, 140*a-b* and/or various configurations of the depicted components 102*a-n*, 104, 106, 110, 140*a-b* may be included in the system 100 without deviating from the scope of embodiments described herein. In some embodiments, the components 102*a-n*, 104, 106, 110, 140*a-b* may be similar in configuration and/or functionality to similarly named and/or numbered components as described herein. In some embodiments, the system 100 (and/or portions thereof) may comprise a digital delegate multi-agent LLM program, system, and/or platform programmed and/or otherwise configured to execute, conduct, and/or facilitate the methods/algorithms 400, 500, 800 of FIG. 4, FIG. 5, and/or FIG. 8 herein, and/or portions or combinations thereof.

The user devices 102*a-n*, in some embodiments, may comprise any types or configurations of computing, mobile electronic, network, user, and/or communication devices that are or become known or practicable. The user devices 102*a-n* may, for example, comprise one or more Personal Computer (PC) devices, computer workstations (e.g., an enterprise employee workstation), tablet computers, such as an iPad® manufactured by Apple®, Inc. of Cupertino, CA, and/or cellular and/or wireless telephones, such as an iPhone® (also manufactured by Apple®, Inc.) or an LG Optimus™ smart phone manufactured by LG® Electronics, Inc. of San Diego, CA, and running the Android® operating system from Google®, Inc. of Mountain View, CA. In some embodiments, the user devices 102*a-n* may comprise devices owned and/or operated by one or more users, such as insurance agents, underwriters, account managers, brokers, customer service representatives, Information Technology (IT) programmers, employees, and/or consultants or service providers. According to some embodiments, the user devices 102*a-n* may communicate with the identity server 106 and/or the LLM server 110 directly and/or via the network 104 (as depicted) to provide and/or define requests (e.g., AI/LLM prompts and ID info). According to some embodiments, any of the user devices 102*a-n* may communicate with the LLM server 110 through and/or via the identity server 106. In some embodiments, the LLM server 110 may execute specially-programmed instructions (not separately shown) stored in the second memory device 140*b* to manage communications (e.g., communication sessions, requests, data transmissions, and/or data inputs and/or data outputs) to and/or from the one or more of the user devices 102*a-n*. According to some embodiments, the user devices 102*a-n* may interface with the LLM server 110 to effectuate communications (direct or indirect) with one or more other user devices 102*a-n* (such communication not explicitly shown in FIG. 1) operated by other users.

The network 104 may, according to some embodiments, comprise a Local Area Network (LAN; wireless and/or wired), cellular telephone, Bluetooth®, Near Field Communication (NFC), and/or Radio Frequency (RF) network with communication links between the identity server 106, the LLM server 110, the user devices 102*a-n*, and/or the memory devices 140*a-b*. In some embodiments, the network 104 may comprise direct communication links between any or all of the components 102*a-n*, 104, 106, 110, 140*a-b* of the system 100. The user devices 102*a-n* may, for example, be directly interfaced or connected to the LLM server 110 and/or the second memory device 140*b* via one or more wires, cables, wireless links, and/or other network components, such network components (e.g., communication links) comprising portions of the network 104. In some embodiments, the network 104 may comprise one or many other links or network components other than (in addition to or in place of) those depicted in FIG. 1. The identity server 106 may, for example, be connected to the user devices 102*a-n* via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 104, 106, 110, 140*a-b* of the system 100. The network 104 may comprise one or more cellular telephone networks with communication links between the user devices 102*a-n* and the LLM server 110, for example, and/or may comprise an Internet Protocol (IP) network with communication links between the LLM server 110 and the identity server 106 and/or the memory devices 140*a-b*, for example.

The identity server 106, in some embodiments, may comprise an electronic and/or computerized controller device, such as a computer server communicatively coupled to interface with the user devices 102*a-n* (directly and/or indirectly). The identity server 106 may, for example, comprise one or more PowerEdge™ R830 rack servers manufactured by Dell®, Inc. of Round Rock, TX, which may include one or more Twelve-Core Intel® Xeon® E5-4640 v4 electronic processing devices. In some embodiments, the identity server 106 may comprise a plurality of processing devices specially-programmed to execute and/or conduct processes that are not practicable without the aid of the identity server 106. The identity server 106 may, for example, intercept and evaluate requests sent from user devices 102*a-n* in a manner that provides improved efficiency and less latency, and reduces processing requirements, which would not be capable of being conducted without the benefit of the specially-programmed identity server 106. According to some embodiments, the identity server 106 may be located remotely from one or more of the user devices 102*a-n*. The identity server 106 may also or alternatively comprise a plurality of electronic processing devices located at one or more various sites and/or locations (e.g., distributed and/or virtual computing). According to some embodiments, the identity server 106 may comprise a security and/or credentialing server, layer, and/or platform that, e.g., (i) authenticates and/or authorizes user access and/or requests and/or (ii) identifies user entitlements (e.g., based on user data from the user request).

In some embodiments, the LLM server 110 may comprise an electronic and/or computerized controller device, such as a computer server communicatively coupled to interface with the user devices 102*a-n* and/or the identity server 106 (directly and/or indirectly). The LLM server 110 may, for example, comprise one or more PowerEdge™ R830 rack servers manufactured by Dell®, Inc. of Round Rock, TX, which may include one or more Twelve-Core Intel® Xeon® E5-4640 v4 electronic processing devices. In some embodiments, the LLM server 110 may comprise a plurality of processing devices specially-programmed to execute and/or conduct processes that are not practicable without the aid of the LLM server 110. The LLM server 110 may, for example, evaluate requests sent from user devices 102*a-n* in a manner that provides improved efficiency and less latency, and reduces processing requirements, which would not be capable of being conducted without the benefit of the specially-programmed LLM server 110. According to some embodiments, the LLM server 110 may be located remotely from one or more of the user devices 102*a-n* and/or the identity server 106. The LLM server 110 may also or alternatively comprise a plurality of electronic processing devices located at one or more various sites and/or locations (e.g., distributed and/or virtual computing).

According to some embodiments, the LLM server 110 may store and/or execute specially programmed instructions to operate in accordance with embodiments described herein. The LLM server 110 may, for example, execute one or more models (e.g., AI and/or mathematical models, such as one or more LLM instances), algorithms, programs, modules, and/or routines that facilitate utilization of a digital delegate multi-agent LLM, as described herein. According to some embodiments, the LLM server 110 may comprise a computerized processing device, such as a computer server and/or other electronic device, to manage and/or facilitate transactions, transmissions, and/or communications to and/or from the user devices 102a-n. An enterprise user, corporate employee, agent, claim handler, underwriter, computer client, and/or other user may, for example, utilize the LLM server 110 to (i) accept user identification and prompt data (e.g., a user request), (ii) identify (e.g., based on the user identification data) one or more entitlements (e.g., authorizations and/or authentications) assigned to the user (e.g., utilizing and/or in conjunction with the identity server 106), (iii) develop a multi-tier plan for resolving the prompt provided by the user (e.g., the plan defining a plurality of actions), (iv) identify a subset of available LLM tools (e.g., secondary LLM agents and/or models) that correspond to the user entitlement(s) and are capable of accomplishing the desired actions, (v) execute the plan by calling the subset of LLM tools, (vi) construct a user response based on results obtained from each secondary LLM agent/model, and/or (vii) forward or transmit the user response to the user (e.g., via one or more of the user devices 102a-n).

In some embodiments, the user devices 102a-n, the identity server 106, and/or the LLM server 110 may be in communication with the memory device(s) 140a-b. The memory devices 140a-b may comprise, for example, various databases and/or data storage mediums that may store, for example, data descriptive of the user devices 102a-n, data descriptive of one or more users (e.g., user ID data), an Active Directory (AD) (and/or other directory), user preference and/or characteristics data, historic user/user request data, user requests (e.g., inputs), response data (e.g., outputs), geolocation data, AI models (e.g., LLM instances and/or types), chain code instructions, blockchain data, cryptographic keys and/or data, login and/or identity credentials, group and/or authorization data, and/or instructions that cause various devices (e.g., the LLM server 110) to operate in accordance with embodiments described herein.

The first memory device 140a may store, for example, user request intercept instructions and/or models, authorization and/or authentication instructions, and/or data that causes communications between the user devices 102a-n and the LLM server 110 to be selectively approved, authorized, authenticated, and/or otherwise validated and/or evaluated, e.g., utilizing and/or accessing AD data (stored in the first memory device 140a and/or elsewhere). According to some embodiments, the first memory device 140a may store user entitlement data that is identified by the identity server 106 querying the first memory device 140a utilizing user ID data, e.g., from the user request. In some embodiments, the second memory device 140b may store (and/or define) various LLM instances, such as a primary LLM agent/model and/or a plurality of secondary LLM agents/models, e.g., accessible to the LLM server 110. In some embodiments, the second memory device 140b may store an LLM tool library that provides a listing of all available LLM instances (e.g., agents and/or models) and/or entitlements required to access LLM instances.

In some embodiments, the memory devices 140a-b may comprise any types, configurations, and/or quantities of data storage devices that are or become known or practicable. The memory devices 140a-b may, for example, comprise an array of optical and/or solid-state hard drives configured to store request data provided by (and/or requested by) the user devices 102a-n, analysis data (e.g., historical data, analysis formulas, and/or mathematical models), and/or various operating instructions, drivers, etc. While the memory devices 140a-b are depicted as standalone components disembodied from (but in communication with) the various user devices 102a-n, the identity server 106, and the LLM server 110, the memory devices 140a-b may comprise multiple components and/or may be part of any or all of the user devices 102a-n, the identity server 106, and the LLM server 110. In some embodiments, multi-component memory devices 140a-b may be distributed across various devices and/or may comprise remotely dispersed components. Any or all of the user devices 102a-n, the identity server 106, and the LLM server 110 may comprise the memory devices 140a-b or one or more portions thereof, for example.

Figure 2:
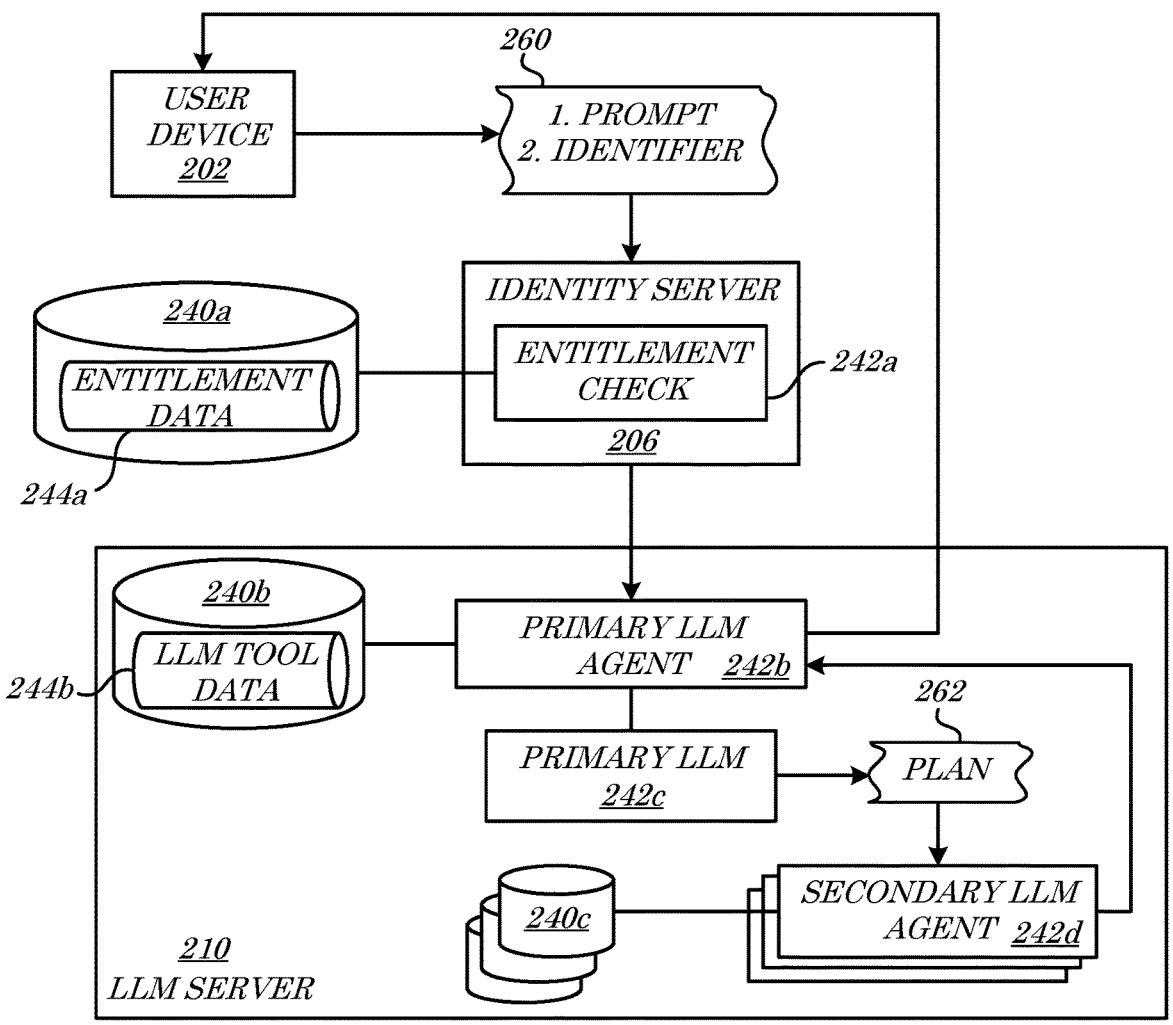
FIG. 2 is a block diagram of a system according to some embodiments.

Turning now to FIG. 2, a block diagram of a system 200 according to some embodiments is shown. In some embodiments, the system 200 may comprise a user device 202 in communication with an identity server 206 and/or an LLM server 210. According to some embodiments, the system 200 may comprise a plurality of data stores 240a-c and/or define and/or comprise a plurality of programs 242a-d and/or data 244a-b. In some embodiments, the user device 202 may be utilized to provide, define, and/or transmit a user request 260. As depicted, the user request 260 may comprise and/or define a prompt and/or an identifier (e.g., of a user of the user device 202; not shown). In one example, the user request 260 may comprise a textual prompt, such as "Given the geographic location entered in this intake form, what can you tell me?".

According to some embodiments, the user device 202 may send and/or the identity server 206 may receive, the user request 260. In some embodiments, the identity server 206 may execute a first program or entitlement check 242a, e.g., utilizing the identifier and/or the user request 260. The entitlement check 242a may, for example, send the identifier (and/or user request 260 and/or a portion thereof) to a first or entitlement data store 240a that stores first or entitlement data 244a, e.g., as a query. According to some embodiments, the entitlement check 242a may identify a portion of the entitlement data 244a that corresponds to the identifier (and/or user request 260 and/or a portion thereof), e.g., as a query result returned from the entitlement data store 240a. In some embodiments, the entitlement check 242a and/or the identity server 206 may comprise an AI model that governs and/or defines access to other models and/or tools, such as the AI-driven cybersecurity enclave management system described in co-pending U.S. patent application Ser. No. 18/388,615 filed on Nov. 10, 2023 and titled "SYSTEMS AND METHODS FOR ARTIFICIAL INTELLIGENCE (AI)-DRIVEN CYBERSECURITY ENCLAVES", the AI-driven cybersecurity enclave management system descriptions and concepts of which are hereby incorporated by reference herein.

In some embodiments, the identity server 206 (and/or the entitlement check 242a thereof) may transmit, forward, and/or provide the user request and/or the identified user entitlement data to the LLM server 210. According to some embodiments, the identity server 206 may comprise and/or be part of the LLM server 210 (i.e., despite being depicted differently in FIG. 2 for purposes of illustration of some embodiments). In some embodiments, the LLM server 210 may execute a second program or primary LLM agent 242b, e.g., utilizing the identifier from the user request 260 and/or any user entitlement data provided by the identity server 206. The primary LLM agent 242b may, for example, comprise an API and/or GUI via which the user (via the user device 202) may interface with, utilize, and/or invoke a third program or primary LLM 242c. The primary LLM 242c may comprise a first instance and/or type of AI model trained in a first manner and/or utilizing a first set of training data (not separately shown), for example, while the primary LLM agent 242b may comprise front-end and/or forward-facing software and/or interface components that permit the user to interact with and/or command the primary LLM 242c.

According to some embodiments, the primary LLM agent 242b may identify a subset of available LLM tools (e.g., fourth programs or secondary LLM agents 242d) by accessing a second data store or tool repository 240b storing second or LLM tool data 244b. The primary LLM agent 242b may send the identifier (and/or user request 260 and/or a portion thereof) and/or user entitlement data to the tool repository 240b, e.g., as a query. According to some embodiments, the primary LLM agent 242b may identify a portion of the LLM tool data 244b that corresponds to the identifier (and/or user request 260 and/or a portion thereof) and/or user entitlement data, e.g., as a query result returned from the tool repository 240b. In such a manner, for example, the primary LLM agent 242b (and/or LLM server 210) may identify and/or define a subset of available secondary LLM agents 242d (e.g., LLM tools; either alone as agents or together with underlying LLM instances, not separately shown) that correspond to the user, user device 202, and/or user request 260 (and/or portion thereof; e.g., the prompt). According to some embodiments, the identified and/or selected subset or "suite" of secondary LLM agents 242d may comprise secondary LLM agents 242d to which the user is entitled access, that are currently available (e.g., based on operational status and/or bandwidth or processing concerns), and/or that satisfy certain pricing and/or access restriction requirements (e.g., based on an actual or estimated cost of use).

In some embodiments, the primary LLM agent 242b may invoke (e.g., call, initiate, and/or transmit a command and/or request to) the primary LLM 242c. The primary LLM 242c may, for example, be passed (e.g., as inputs) the user request 260 (and/or a portion thereof, such as the prompt) and a listing of the identified suite of LLM tools (e.g., the secondary LLM agents 242d). According to some embodiments, the primary LLM 242c may be executed (e.g., by the LLM server 210) to determine, generate, and/or define a plan 262. The plan 262 may, for example, comprise a listing of a plurality of actions (not separately shown), with each action being assigned to one or more of the secondary LLM agents 242d. In one example, the plan 262 may comprise a bullet point-style list of actions and/or tasks such as: (i) 'I must use Tool A to extract the address in question', (ii) 'Then I must use Tool B to determine the enrichment information IF the user is allowed to access Tool B', and (iii) 'Then I must use Tool C to determine if a policy is written for this geographic location/address IF the user is allowed to access Tool C'. In some embodiments, the primary LLM 242c may be trained and/or configured to parse and/or segment the user request 260 into a plurality of discrete substeps and/or parts, e.g., by being trained on a first training data set (not shown) descriptive of previous multi-part task requests and/or solutions thereto. In some embodiments, the primary LLM 242c may analyze, interpret, and/or assign meaning to various characters, words, and/or phrases in the user request 260, e.g., as interpreted by the underlying logic and/or calculations that define the primary LLM 242c.

According to some embodiments, the primary LLM 242c may generate the plan 262 and may execute the plan 262. The primary LLM 242c may, for example, step through the plan 262 to perform each of a plurality of multi-part tasks and/or actions. In some embodiments, the primary LLM 242c may invoke (e.g., call, initiate, and/or transmit a command and/or request to) each of the secondary LLM agents 242d identified in the plan 262, e.g., to perform, conduct, and/or resolve any particular actions assigned thereto. The primary LLM 242c may, for example, assign actions to secondary LLM agents 242d based on known capabilities of the secondary LLM agents 242d. In some embodiments, each of the secondary LLM agents 242d may be called (sequentially and/or simultaneously) to return a result for the assigned action(s). In some embodiments, the secondary LLM agents 242d may access, query, and/or consult one or more third or supplementary data stores 240c, e.g., to carry out and/or resolve any or all assigned actions/tasks. The supplementary data store 240c may comprise, according to some embodiments, an online/cloud-based and/or third-party data store, data service, etc. In one example, (i) a first 'Tool A' may comprise a text extraction tool that answers the question 'What address is stored in this document?', (ii) a second 'Tool B' may comprise a geoenrichment service that answers the question 'What information does this system know about the address?', and/or (iii) a third 'Tool C' may comprise a policy tool that answers the question 'Is there a policy written for the address?'. According to some embodiments, the results (e.g., sub-results) may be provided to the primary LLM agent 242b and the primary LLM agent 242b (and/or the primary LLM 242c) may utilize the responses (e.g., plurality of sub-responses) to construct a response (not separately shown) to the prompt. In one example, the response (e.g., a user response) may comprise a textual answer to the prompt (and/or the user request 260) that (i) tells the user what is found about the address in question, (ii) and provides policy information to a user with entitlement/rights to policy information. In some embodiments, the user response may be transmitted back and/or provided to the user device 202, e.g., in response to the original user request 260.

In some embodiments, a single multi-tier/multi-action plan 262 may be generated, developed, computed, and/or otherwise defined by the primary LLM agent 242b and/or the primary LLM 242c. In other embodiments, multiple plans 262 (e.g., multi-tier/multi-action) may be generated, developed, computed, and/or otherwise defined. According to some embodiments, in the case that multiple plans 262 are developed (and executed), the multiple plans 262 may be executed independently or in concert/cooperation. In some embodiments, not all plans 262 may be developed at the same time. An execution of a first plan 262 may produce a result that triggers creation of one or more additional plans 262, for example, such that plan generation and execution may be recursive in nature. According to some embodiments, results from execution of each of the plurality of plans 262 may be utilized to define and/or generate the user response.

Fewer or more components 202, 206, 210, 240a-c, 242a-d, 244a-b, 260, 262 and/or various configurations of the depicted components 202, 206, 210, 240a-c, 242a-d, 244a-

*b*, 260, 262 may be included in the system 200 without deviating from the scope of embodiments described herein. In some embodiments, the components 202, 206, 210, 240*a*-*c*, 242*a*-*d*, 244*a*-*b*, 260, 262 may be similar in configuration and/or functionality to similarly named and/or numbered components as described herein. In some embodiments, the system 200 (and/or portions thereof) may comprise a digital delegate multi-agent LLM program, system, and/or platform programmed and/or otherwise configured to execute, conduct, and/or facilitate the methods/algorithms 400, 500, 800 of FIG. 4, FIG. 5, and/or FIG. 8 herein, and/or portions or combinations thereof.

Figure 3:
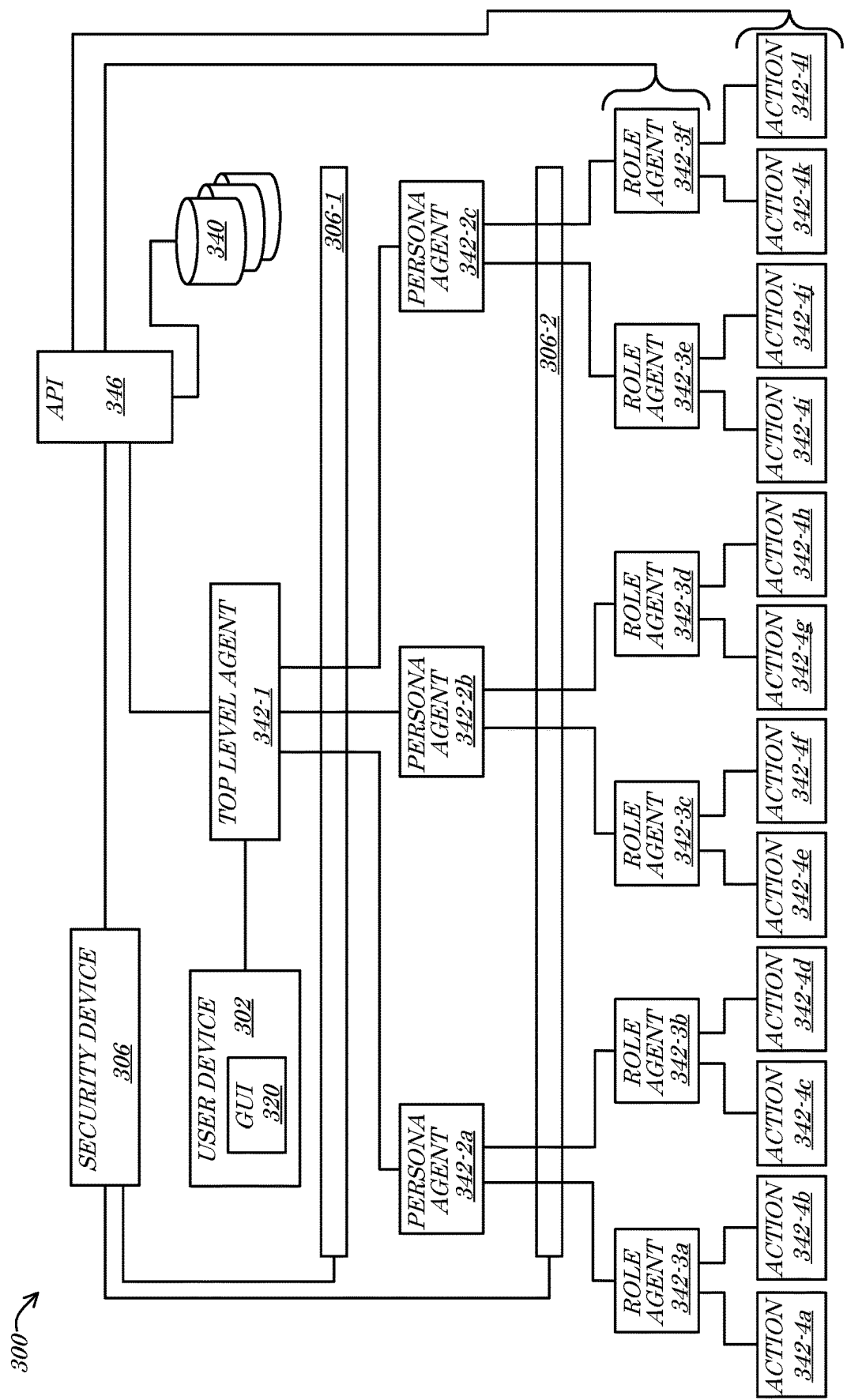
FIG. 3 is a block diagram of a system according to some embodiments.

Referring now to FIG. 3, a block diagram of a system 300 according to some embodiments is shown. In some embodiments, the system 300 may comprise a digital delegate multi-agent LLM system (e.g., the LLM servers 110, 210 of FIG. 1 and/or FIG. 2 herein) that is configured to receive and/or intake user requests, such as complex AI prompts, analyze the complex request/prompt, develop a multi-tier/multi-agent plan for developing a response, executing the plan, and providing the response (e.g., as output). In some embodiments, the system 300 may comprise (or be in communication with) a user device 302 that communicates via and/or subject to (e.g., is governed by) a security device 306 and/or one or more security layers 306-1, 306-2 thereof and/or associated therewith. According to some embodiments, the user device 302 may comprise and/or generate or display (e.g., output) an interface, such as a GUI 320, via which a user (not shown) may interface with the system 300. In some embodiments, the system may comprise one or more data storage or memory devices 340 and/or may comprise and/or define various programs 342-1, 342-2*a*-342-2*c*, 342-3*a*-342-3*f*, 342-4*a*-342-4*l*, 346, e.g., for generating a response to the user request/prompt.

According to some embodiments, the user may interact with the GUI 320 to interface with a first program, programmatic element, or top level agent 342-1 of the system 300. The top level agent 342-1 may comprise, for example, a primary LLM agent that is programmed to receive input from the GUI 320. In some embodiments, the top level agent 342-1 comprises and/or executes a first or primary LLM (not separately shown) that interprets the request from the user. According to some embodiments, the top level agent 342-1 may parse the user request and/or extract portions of data (e.g., header and/or metadata) therefrom. The top level agent 342-1 may, for example, extract a user identifier from the request and pass the user identifier to the security device 306, e.g., via and/or through an API 346. The API 346 and/or the security device 306 may, in some embodiments, utilize the user identifier to query the one or more memory devices 340, e.g., to identify entitlements assigned to the user. According to some embodiments, the entitlements may define one or more "personas" or "roles" of the user and define associated access rights, protocols, authorizations, and/or credentials (e.g., user names, passwords, codes, keys, etc.). In some embodiments, the API 346 and/or the security device 306 may provide the entitlement data to the top level agent 342-1. According to some embodiments, the top level agent 342-1 may utilize the user identification and/or entitlement data to select and/or access one or more secondary LLM agents and/or models, such as one or more persona agents 342-2*a*-342-2*c*.

In some embodiments, for example, the top level agent 342-1 may select a first persona agent 342-2*a* from the three (3) persona agents 342-2*a*-342-2*c* depicted, in a case where it is determined that the user is entitled to access only the first persona agent 342-2*a* (e.g., and not the other two (2) persona agents 342-2*b*, 342-2*c*) and/or in a case where the entitlement and/or user identification signify that the user is assigned to a particular class, group, and/or role that aligns with the capabilities of the first persona agent 342-2*a*. In some embodiments, the top level agent 342-1 may select all three (3) persona agents 342-2*a*-342-2*c* from a larger set of available agents (not shown), e.g., based on user entitlement and/or other user data. In some embodiments, such as in a case where the entitlement data comprises credentials and/or other access information, the top level agent 342-1 may communicate with the persona agents 342-2*a*-342-2*c* via a first security layer 306-1, e.g., by utilizing one or more sets of credentials defined by the entitlement data and/or assigned to the specific persona agents 342-2*a*-342-2*c*.

According to some embodiments, the top level agent 342-1 and/or the persona agents 342-2*a*-342-2*c* may be trained to analyze the user request (e.g., prompt) in a context specific to the user and/or the user's role, group, etc. In such a manner, for example, the top level agent 342-1 and/or the persona agents 342-2*a*-342-2*c* may process the user request (and/or the prompt portion thereof) to develop a multi-tier plan (not shown) for responding to (and/or resolving) the user request. In some embodiments, the top level agent 342-1 and/or the persona agents 342-2*a*-342-2*c* may interface with the API 346 to access the one or more memory devices 340 to utilize stored data to formulate the multi-tier plan. The top level agent 342-1 and/or the persona agents 342-2*a*-342-2*c* may, for example, access the one or more memory devices 340 to identify and/or compute various actions for the plan. In some embodiments, the top level agent 342-1 and/or the persona agents 342-2*a*-342-2*c* may utilize data from the one or more memory devices 340 to identify a plurality of additional (e.g., additional secondary), tertiary, or role agents 342-3*a*-342-3*f*.

In some embodiments, the top level agent 342-1 and/or the persona agents 342-2*a*-342-2*c* may select a first role agent 342-3*a* from the six (6) role agents 342-3*a*-342-3*f* depicted, in a case where it is determined that the user is entitled to access only the first role agent 342-3*a* (e.g., and not the other five (5) role agents 342-3*b*, 342-3*c*, 342-3*d*, 342-3*e*, 342-3*f*) and/or in a case where the entitlement, user identification, and/or actions designated and/or defined by the plan align with the access rights and/or capabilities of the first role agent 342-3*a*. In some embodiments, the top level agent 342-1 and/or the persona agents 342-2*a*-342-2*c* may select all six (6) role agents 342-3*a*-342-3*f* from a larger set of available agents (not shown), e.g., based on user entitlement and/or plan/action data. In some embodiments, such as in a case where the entitlement data comprises credentials and/or other access information specific to the user and the role agents 342-3*a*-342-3*f*, the top level agent 342-1 and/or the persona agents 342-2*a*-342-2*c* may communicate with the role agents 342-3*a*-342-3*f* via a second security layer 306-2, e.g., by utilizing one or more sets of credentials defined by the entitlement data and/or assigned to the specific role agents 342-3*a*-342-3*f*.

According to some embodiments, each role agent 342-3*a*-342-3*f* may be assigned and/or given (e.g., have transmitted to and accordingly receive) one or more specific actions 342-4*a*-342-4*l* to perform. Each action 342-4*a*-342-4*l* may, for example, comprise a specific program, module, model, formula, algorithm, and/or other programmatic feature specially-programmed to perform a discrete task. In some embodiments, the role agents 342-3*a*-342-3*f* may call, invoke, and/or execute each respective action 342-4*a*-342-4*l* and provide a result from each action 342-4*a*-342-4*l* to the corresponding (e.g., calling/parent) top level agent 342-1 and/or persona agent 342-2a-342-2c. In some embodiments, the role agents 342-3a-342-3f may interface with the API 346 to access the one or more memory devices 340 to utilize stored data to carry out the actions 342-4a-342-4l. The role agents 342-3a-342-3f may, for example, access the one or more memory devices 340 to identify and/or acquire data utilized by the actions 342-4a-342-4l. In some embodiments, role agents 342-3a-342-3f may utilize data from the one or more memory devices 340 to identify a plurality of additional (e.g., additional tertiary), quaternary, and/or other actions, agents, and/or models (not shown). According to some embodiments, the role agents 342-3a-342-3f and/or actions 342-4a-342-4l may be selected (e.g., from larger sets, not shown) based on various additional criteria, such as, but not limited to, cost data, bandwidth data, and/or historic performance data (e.g., with respect to resolving and/or accomplishing a particular type of task).

In some embodiments, the responses and/or results from the various actions 342-4a-342-4l provided to the top level agent 342-1 and/or the persona agents 342-2a-342-2c by the role agents 342-3a-342-3f may be utilized to construct, formulate, compute, generate, and/or otherwise define a user response (i.e., a response to the user request/prompt). The top level agent 342-1 and/or the persona agents 342-2a-342-2c may, for example, aggregate, combine, and/or otherwise utilize the various responses/results to construct a multi-tier response based on the execution of the plan. According to some embodiments, the user result may be sent (e.g., transmitted and/or provided) by the top level agent 342-1 and/or the persona agents 342-2a-342-2c to the user device 302 and/or the GUI 320 thereof. In such a manner, for example, the user may utilize a first LLM (e.g., via and/or comprising the top level agent 342-1) to generate a multi-tier plan, e.g., based on the user's entitlements, and the system 300 may leverage a plurality of secondary (and/or tertiary and/or quaternary) LLM instances (e.g., the persona agents 342-2a-342-2c and/or the role agents 342-3a-342-3f) to generate a response, e.g., based on a plurality of discrete actions outlined in the plan.

Fewer or more components 302, 306, 306-1, 306-2, 320, 340, 342-1, 342-2a-342-2c, 342-3a-342-3f, 342-4a-342-4l, 346 and/or various configurations of the depicted components 302, 306, 306-1, 306-2, 320, 340, 342-1, 342-2a-342-2c, 342-3a-342-3f, 342-4a-342-4l, 346 may be included in the system 300 without deviating from the scope of embodiments described herein. In some embodiments, components 302, 306, 306-1, 306-2, 320, 340, 342-1, 342-2a-342-2c, 342-3a-342-3f, 342-4a-342-4l, 346 may be similar in configuration and/or functionality to similarly named and/or numbered components as described herein. In some embodiments, the system 300 (and/or portions thereof) may comprise a digital delegate multi-agent LLM program, system, and/or platform programmed and/or otherwise configured to execute, conduct, and/or facilitate the methods/algorithms 400, 500, 800 of FIG. 4, FIG. 5, and/or FIG. 8 herein, and/or portions or combinations thereof.

III. Digital Delegate Multi-Agent LLM Processes

Figure 4:
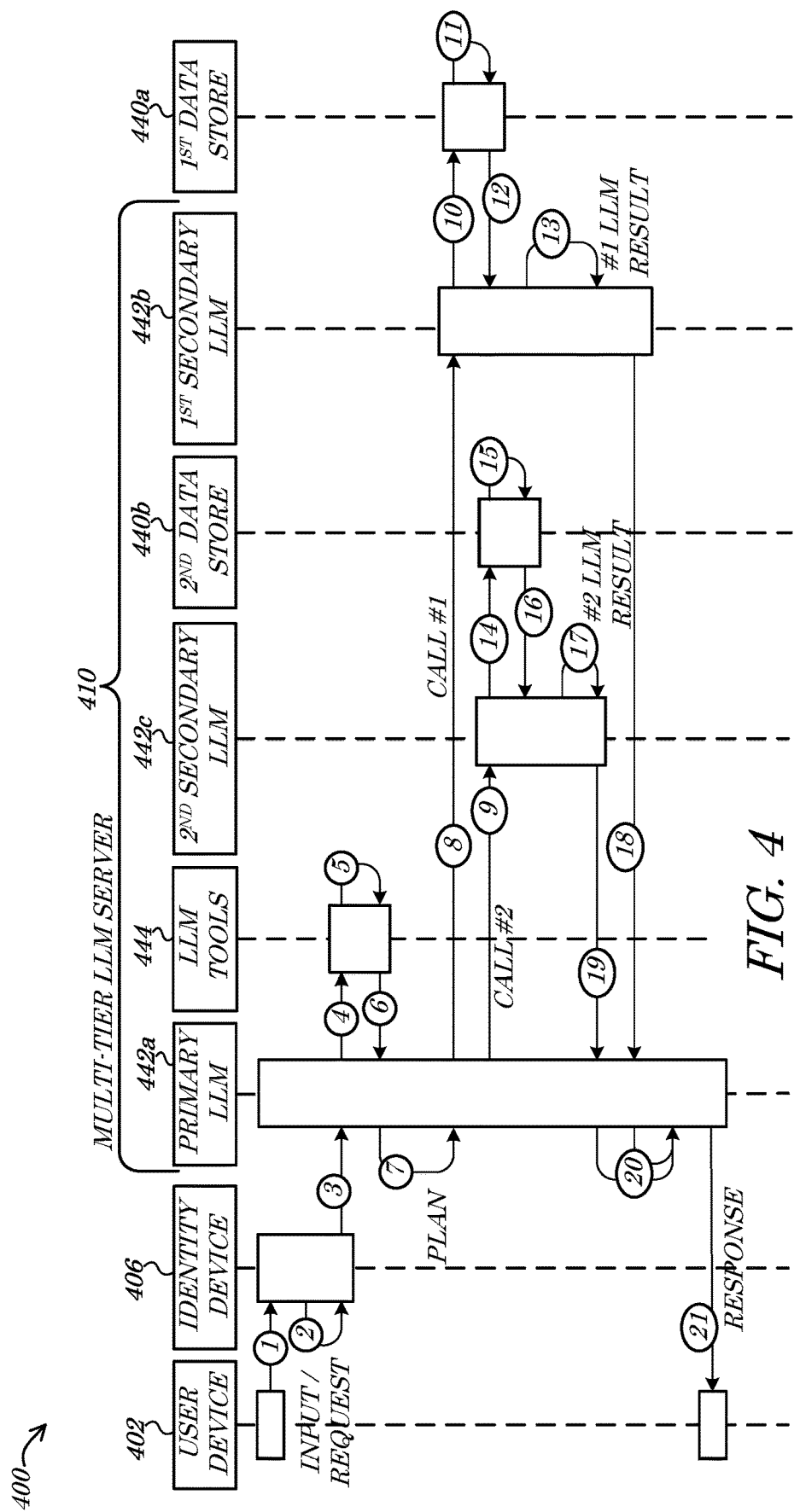
FIG. 4 is a system flow diagram of a method according to some embodiments.

Referring now to FIG. 4, a system flow diagram of a process or method 400 according to some embodiments is shown. The method 400 may, for example, be executed by various hardware and/or logical components via interactive communications, involving communications between a user device 402, an identity device 406, a multi-tier LLM server 410, various programs 442a-c, data 444, and/or memory devices 440a-b. In some embodiments, a first data store 440a may reside external to, but be accessible to (e.g., in communication with) the multi-tier LLM server 410 (as depicted). According to some embodiments, the multi-tier LLM server 410 may comprise a second data store 440b, a primary LLM 442a, a 1st secondary LLM 442b, a 2nd secondary LLM 442c, and/or LLM tools data 444, as depicted. According to some embodiments, the multi-tier LLM server 410 may also or alternatively comprise the identity device 406 (and/or the first data store 440a). While not explicitly depicted in FIG. 4, the devices 402, 406, 410, 440a-b and/or programs 442a-c may be in communication via various networks and/or network components, and/or may process received data by executing trained and/or specially-coded instructions via one or more electronic processing devices (not separately shown). Any or all of the devices 402, 406, 410, 440a-b, programs 442a-c, and/or data 444 may be similar in configuration and/or functionality to similarly named and/or numbered components as described herein and/or may otherwise comprise and/or be executed, implemented, and/or facilitated by hardware, firmware, microcode, and/or programming elements implemented by one or more processing devices, computers, servers, and/or network devices.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes, methods, and/or algorithms described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory devices 140a-b, 240a-c, 340, 640, 740a-e, 840 of FIG. 1, FIG. 2, FIG. 3, FIG. 6, FIG. 7A, FIG. 7B, FIG. 7C, FIG. 7D, FIG. 7E, and/or FIG. 8 herein) may store thereon instructions that when executed by a machine (such as a computerized processor) result in performance according to any one or more of the embodiments described herein.

In some embodiments, the method 400 (e.g., for providing a digital delegate multi-agent LLM) may comprise and/or begin at (and/or comprise) "1" with transmitting or inputting a request from the user device 402. In some embodiments, the transmitting or inputting at "1" may comprise a transmission of information descriptive of a prompt (e.g., a complex prompt), a user identifier, and/or other user data. The information may include, for example, an indication of an IP/URL of the identity device 406 and/or the multi-tier LLM server 410, an indication of an account and/or other identifier of the user and/or the user device 402, and/or an indication of an alphanumeric and/or multimedia prompt (e.g., a freeform textual query intended for processing by an AI system/model). According to some embodiments, the request/input may comprise authorization and/or authentication data, such as a user name, password, cryptographic key or hash, etc. In some embodiments, some of the information may be stored in a body of the request and some of the information may be stored in a header of the request. As described herein, the transmission of the request (at "1")

may be routed to and/or intercepted by the identity device 406. Instead of being forwarded and/or directed directly to the multi-tier LLM server 410 (e.g., the intended target/destination), for example, the identity device 406 may be utilized to first evaluate the request, e.g., with respect to entitlement, authorization, and/or authentication of the user and/or user device 402.

In some embodiments, the identity device 406 may perform a first evaluation of the request (e.g., in response to receiving the request) by identifying entitlements and/or security data assigned to and/or associated with the user and/or the user device 402, at "2". The identity device 406 may query stored data (not separately shown), for example, to identify data records for entitlements/credentials that match the provided user data (e.g., user account and/or identification data) in the user request from the user device 402. In some embodiments, a listing and/or other identification of entitlements and/or security data assigned to the user/user device 402 may be transmitted and/or provided to the multi-tier LLM server 410 and/or the primary LLM 442a thereof, at "3".

According to some embodiments, the multi-tier LLM server 410 and/or the primary LLM 442a may receive and/or acquire the entitlement/security data and may determine, utilizing the entitlement/security data, a subset of available LLM tools, models, and/or programs that correspond to the user's entitlements, authorizations, authentications, roles, etc. In some embodiments, the multi-tier LLM server 410 and/or the primary LLM 442a may initiate a query to the LLM tools data 444, at "4". The query may, for example, comprise an identification of the entitlements, security access rights, credentials, and/or other security data received from the identity device 406. In some embodiments, the LLM tools data 444 (and/or a data device (not shown) and/or the multi-tier LLM server 410) may process the query at "5" and return a query result to the multi-tier LLM server 410 and/or the primary LLM 442a, at "6". The query result may indicate whether any (and/or which) records in the LLM tools data 444 match the user entitlements and/or may include a listing of a subset of available tools/models to which the user has access.

In some embodiments, the method 400 may comprise and/or the multi-tier LLM server 410 and/or the primary LLM 442a may continue evaluating the user request (e.g., in response to receiving the request and/or prompt portion thereof) by constructing a multi-tier response plan, at "7". The primary LLM 442a may be specially trained and/or programmed to dissect, parse, and/or segment complex prompts into a plurality of smaller and/or discrete tasks and/or actions, for example, each task/action/goal capable of being performed (e.g., to an acceptable and/or desirable level of performance-such as with a minimum number of error artifacts and/or hallucinations) by a specific secondary LLM 442b-c. According to some embodiments, the plan may comprise a listing and/or schedule of actions and may assign each action to one or more secondary LLM 442b-c instances. In some embodiments, a first set of actions may be assigned to the $1^{st}$ secondary LLM 442b for example, while a second set of actions may be assigned to the $2^{nd}$ secondary LLM 442c. According to some embodiments, additional actions may be assigned to other LLM instances (not shown).

According to some embodiments, the method 400 may comprise and/or the multi-tier LLM server 410 and/or the primary LLM 442a may invoke, execute, and/or call the secondary LLM 442b-c instances, at "8" and/or "9". Once the plan is generated and/or defined, for example, the primary LLM 442a may execute the plan by stepping through each task and/or action thereof and (i) calling an appropriate/assigned secondary LLM 442b-c and/or (ii) executing the primary LLM 442a, e.g., to accomplish each task and/or action. In response to the calls, the secondary LLM 442b-c instances may process the required tasks to produce one or more results. The $1^{st}$ secondary LLM 442b may, for example, receive the first call (at "8") and execute specially programmed and/or trained algorithms (e.g., a corresponding LLM instance) that cause a first query to be sent to the $1^{st}$ data store 440a, at "10". According to some embodiments, the $1^{st}$ secondary LLM 442b may utilize a first set of credentials (e.g., of the user and/or derived from the entitlement data) to access the $1^{st}$ data store 440a (e.g., on behalf of the user; e.g., without requiring the user to input and/or specify the credentials). In some embodiments, the $1^{st}$ data store 440a may process the first query by identifying records of stored data that match first query parameters, at "11". According to some embodiments, the $1^{st}$ data store 440a may return a first query result to the $1^{st}$ secondary LLM 442b, e.g., in response to the receiving of the first query, such as an indication of matching data records and/or data associated therewith, at "12". In some embodiments, the $1^{st}$ secondary LLM 442b may process the received first query results to determine, derive, compute, and/or calculate a first LLM result, at "13".

In some embodiments, the 2nd secondary LLM 442c may receive the second call (at "9") and execute specially programmed and/or trained algorithms (e.g., a corresponding LLM instance) that cause a second query to be sent to the 2nd data store 440b, at "14". According to some embodiments, the 2nd secondary LLM 442c may utilize a second set of credentials (e.g., of the user and/or derived from the entitlement data) to access the 2nd data store 440b (e.g., on behalf of the user; e.g., without requiring the user to input and/or specify the credentials). In some embodiments, the 2nd data store 440b may process the second query by identifying records of stored data that match second query parameters, at "15". According to some embodiments, the 2nd data store 440b may return a second query result to the 2nd secondary LLM 442c, e.g., in response to the receiving of the second query, such as an indication of matching data records and/or data associated therewith, at "16". In some embodiments, the 2nd secondary LLM 442c may process the received second query results to determine, derive, compute, and/or calculate a second LLM result, at "17".

According to some embodiments, the $1^{st}$ secondary LLM 442b may transmit the first LLM result to the primary LLM 442a at "18" and/or the 2nd secondary LLM 442c may transmit the second LLM result to the primary LLM 442a at "19". Each secondary LLM 442b-c may, for example, respond to the primary LLM 442a by providing a result and/or resolution of the assigned and/or requested task and/or action. In such a manner, for example, each action of the plan may be satisfied either directly by the primary LLM 442a or by the plurality of invoked secondary LLM 442b-c instances. In some embodiments, the primary LLM 442a may process the completed tasks and/or actions to generate and/or derive a user response, at "20". Each sub-result provided by the plurality of secondary LLM 442b-c instances may be combined, aggregated, compared, contrasted, and/or otherwise processed by the primary LLM 442a to formulate a multi-tier, multi-LLM user response, e.g., in text, alphanumeric, and/or multimedia formats.

In some embodiments, the multi-tier LLM server 410 and/or the primary LLM 442a may transmit the generated user response to the user device 402, at "21". The message transmitted to (and accordingly received by) the user device 402 may comprise, for example, an AI response that addresses all portions of the complex/multi-tier user request. According to some embodiments, as the secondary LLM 442*b-c* instances utilized to process and/or analyze different portions of the user request may be selected based on both user entitlement data (e.g., the user has access to the particular secondary LLM 442*b-c* instances) and data descriptive of the types of actions the secondary LLM 442*b-c* instances are trained to perform, the completed user response may provide a valid and full response to the user with error artifacts and/or hallucination occurrences being below desirable thresholds and with reference only to data that the user is authorized to access.

While many specific actions of the method 400 have been described with respect to FIG. 4, fewer or more actions, transmissions, and/or processing procedures (e.g., query executions) may be implemented in the method 400 without deviating from embodiments herein. There are many possible secondary LLM 442*b-c* instances and data stores 440*a-b* that could be utilized based on the content of the user request with respect to the method 400, for example, and only one example of these plurality of possibilities is fully depicted in FIG. 4, solely for ease of illustration. According to some embodiments, any transmission sent from an origin to a destination may be received by and/or at the destination, e.g., in response to the transmission. In some embodiments, fewer or more components 402, 406, 410, 440*a-b*, 442*a-c*, 444 and/or various configurations of the depicted components 402, 406, 410, 440*a-b*, 442*a-c*, 444 may be included in the method 400 without deviating from the scope of embodiments described herein. In some embodiments, the components 402, 406, 410, 440*a-b*, 442*a-c*, 444 may be similar in configuration and/or functionality to similarly named and/or numbered components as described herein. In some embodiments, the method 400 (and/or one or more portions thereof) may comprise a digital delegate multi-agent LLM program, system, and/or platform programmed and/or otherwise configured to execute, conduct, and/or facilitate the methods/algorithms 500, 800 of FIG. 5 and/or FIG. 8 herein, and/or portions or combinations thereof.

Figure 5:
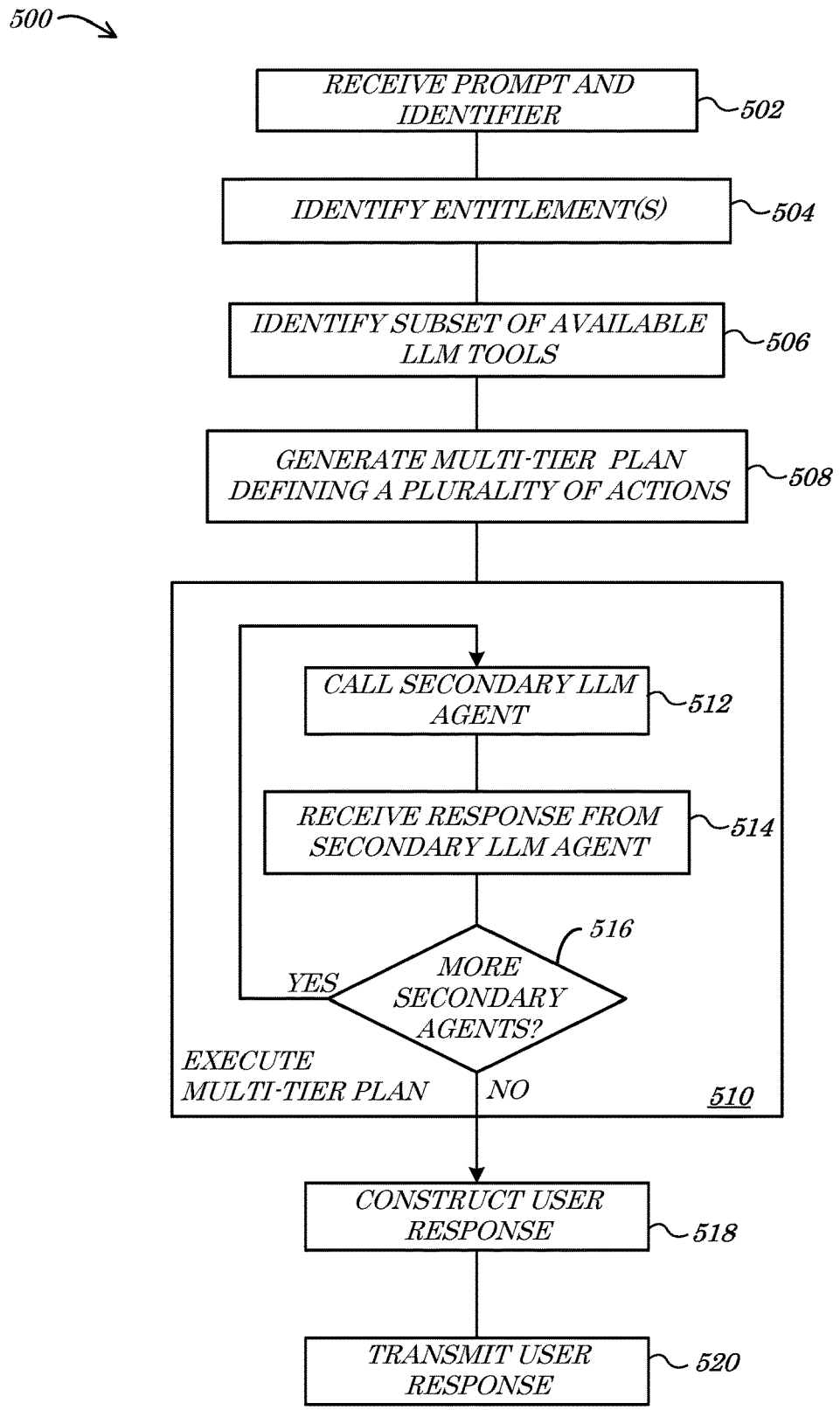
FIG. 5 is a flow diagram of a method according to some embodiments.
Figure 6:
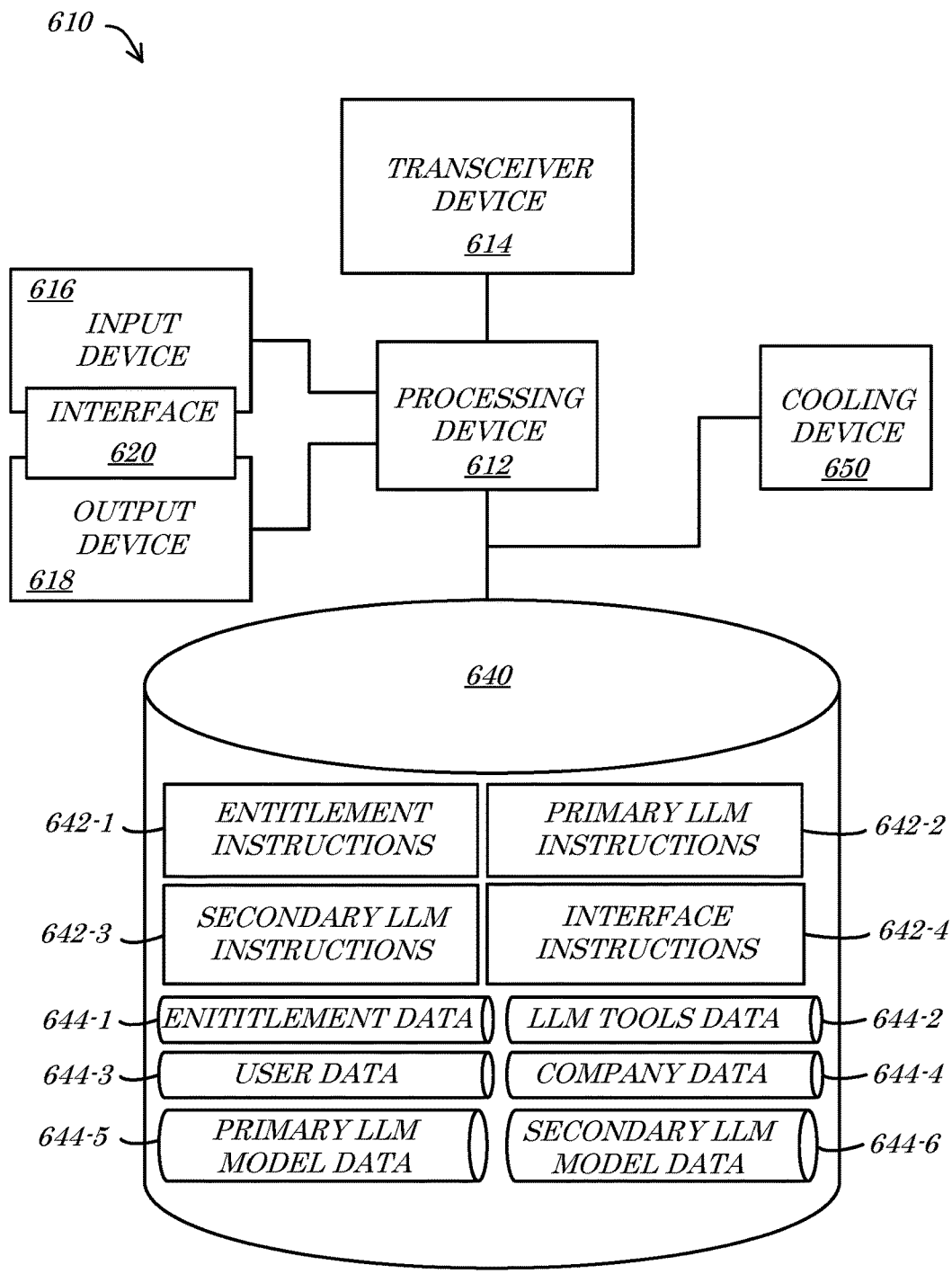
FIG. 6 is a block diagram of an apparatus according to some embodiments.
Figure 7A:
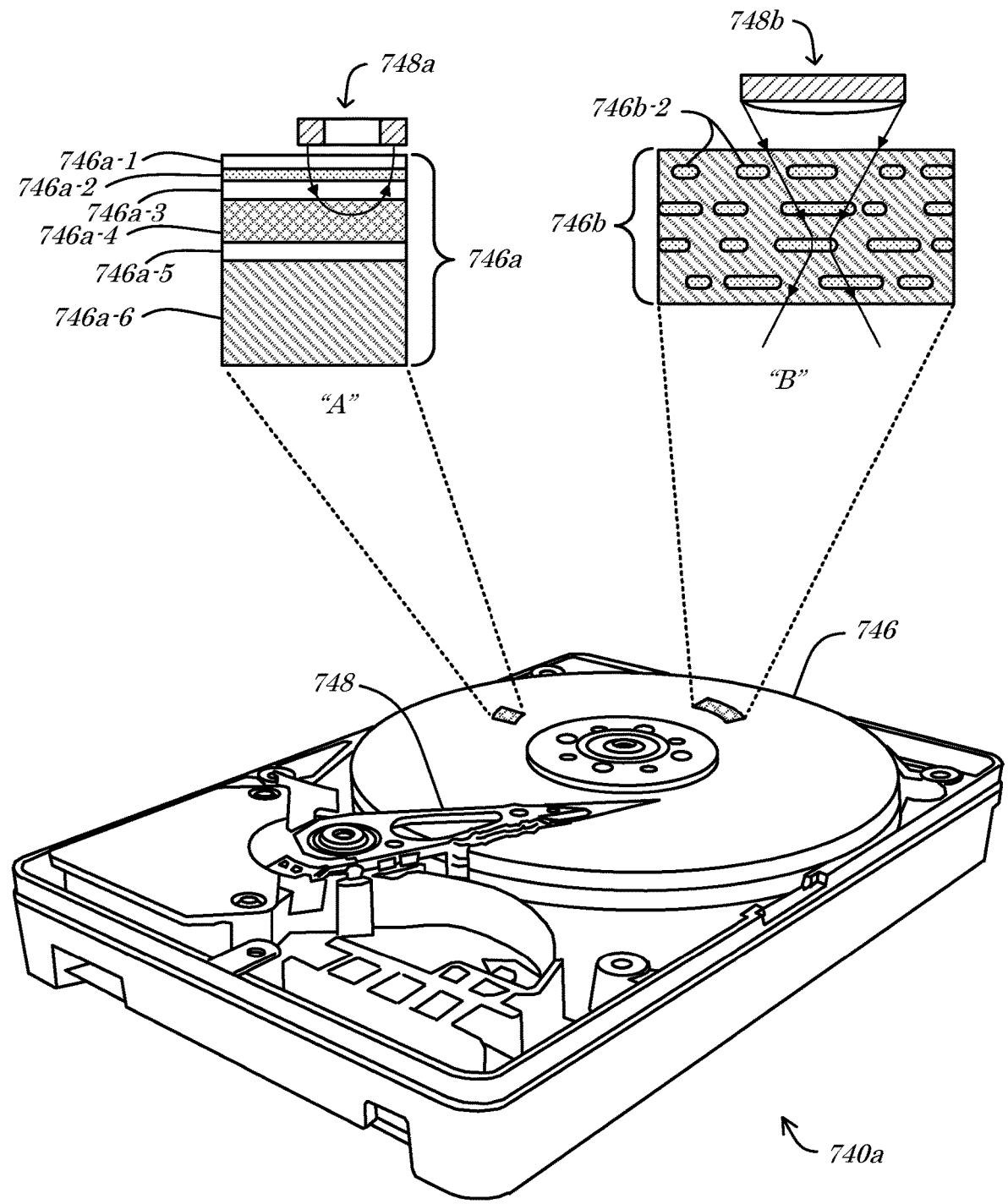
FIG. 7A, FIG. 7B, FIG. 7C, FIG. 7D, and FIG. 7E are perspective diagrams of exemplary data storage devices according to some embodiments.
Figure 7B:
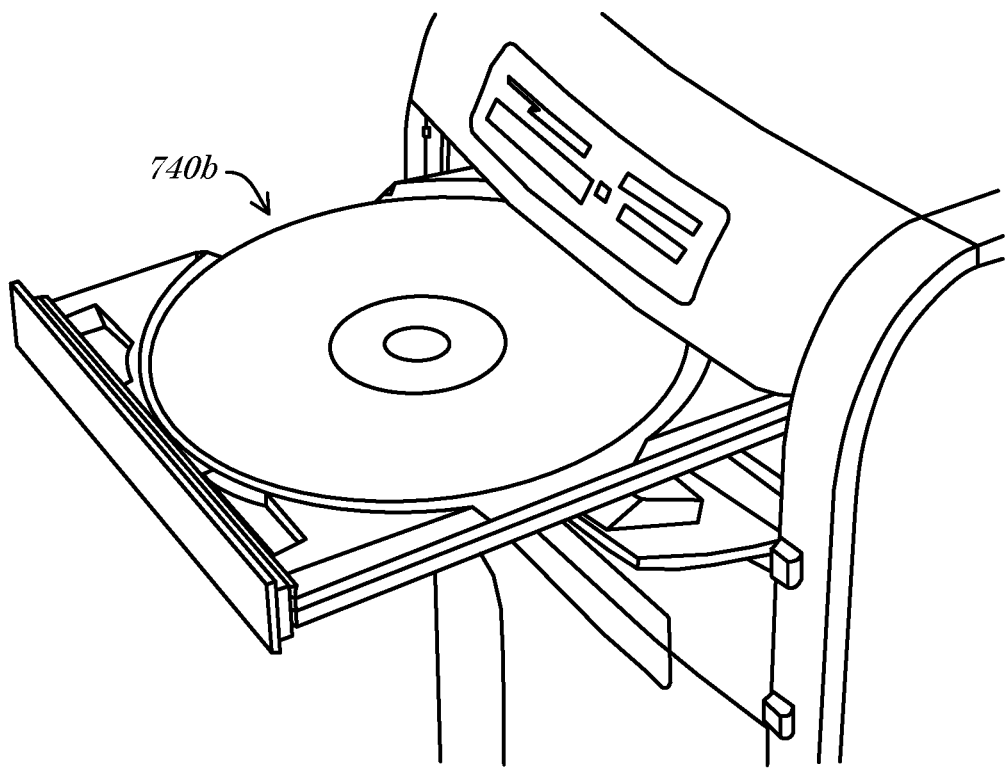
Figure 7C:
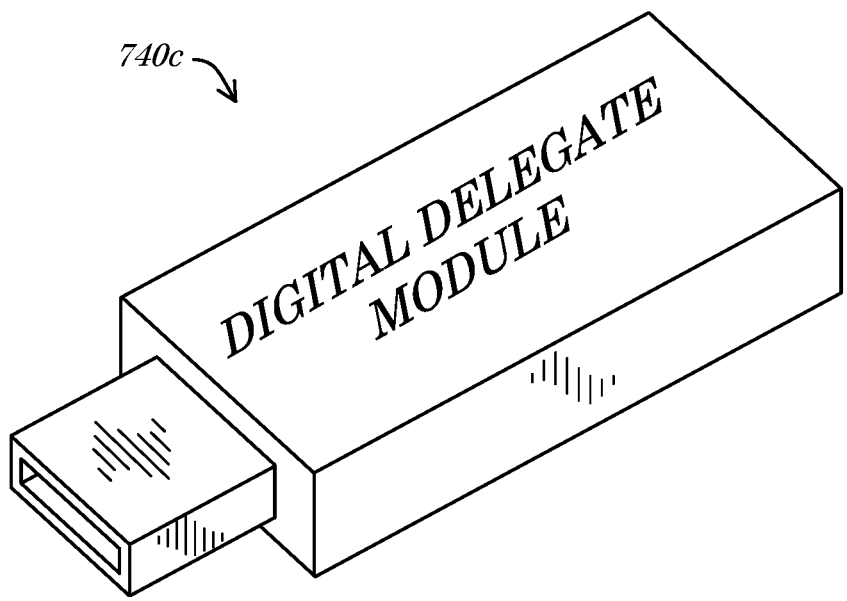
Figure 7D:
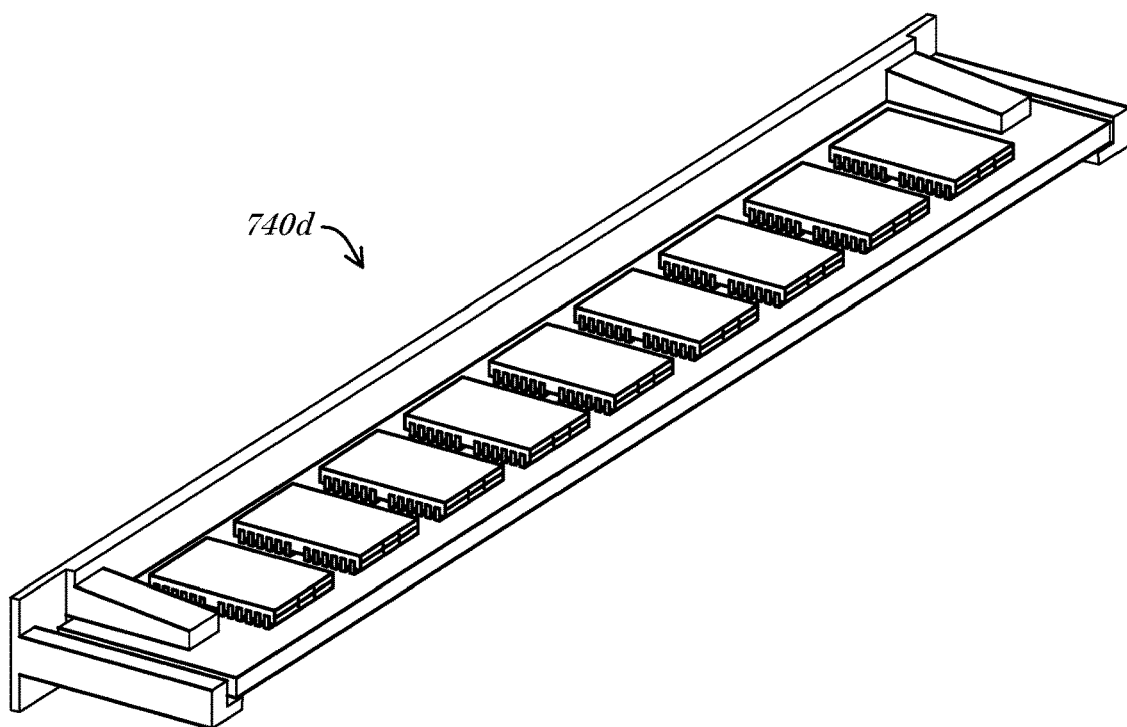
Figure 7E:
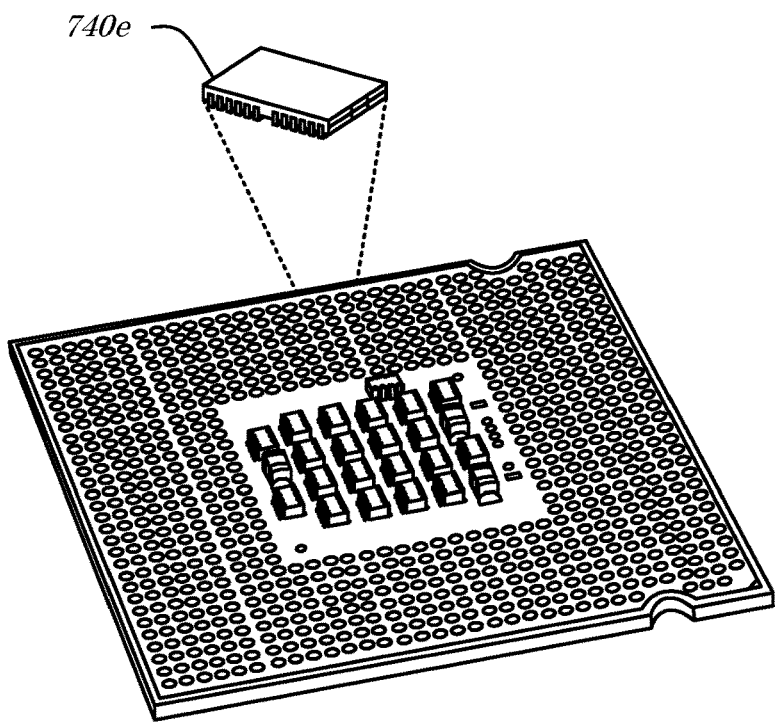

Referring now to FIG. 5, a flow diagram of a method 500 according to some embodiments is shown. In some embodiments, the method 500 may be performed and/or implemented by and/or otherwise associated with one or more specialized and/or specially-programmed computers (e.g., the user devices 102*a-n*, 202, 302, 402, the identity server/security device/identity device 106, 206, 306, 406 and/or the LLM server/apparatus 110, 210, 300, 410, 610, all of FIG. 1, FIG. 2, FIG. 3, FIG. 4, and/or FIG. 6 herein), computer terminals, computer servers, computer systems and/or networks, and/or any combinations thereof (e.g., by one or more multi-threaded and/or multi-core processing units of a digital delegate multi-agent LLM system). In some embodiments, the method 500 may be embodied in, facilitated by, and/or otherwise associated with various input mechanisms and/or interfaces (e.g., the interfaces 320, 620 of FIG. 3 and/or FIG. 6 herein).

According to some embodiments, the method 500 may comprise receiving (e.g., by a processing device, via an electronic communication network, and/or from a remote user device and/or interface) a prompt and identifier (e.g., a user request), at 502. The user request (input) may, for example, be generated by a remote user device (e.g., an employee workstation and/or first service) operated by an entity desiring to receive a response/output from a digital delegate system. In some embodiments, the user request may comprise data/content (e.g., text, images, audio, video, etc.) that is descriptive of a prompt (e.g., a query and/or task) that the user wishes the system to resolve. In some embodiments, the user request may include a plurality of prompts, data elements, values, and/or characters. According to some embodiments, the user request may comprise and/or include data descriptive of and/or identifying the user, a device of the user, a name, IP address, URL, and/or other identifier of the digital delegate system, a user name, password, and/or other credentials, e.g., explicitly as part of the request and/or hidden/embedded, such as in a data packet header, metadata, etc. According to some embodiments, the request may be received by a computer system and/or a component thereof (such as a router). According to some embodiments, the prompt may comprise a "complex" prompt, meaning a prompt that comprises multiple parts, portions, and/or logically differentiated segments, such that a single AI/LLM could not reasonably be trained to resolve the entire prompt without introducing error artifacts and/or hallucinations above a desirable threshold.

In some embodiments, the method 500 may comprise identifying (e.g., by the processing device) entitlements, at 504. The request received by the digital delegate system may be intercepted and/or directed or routed to an access and/or identity management device, tool, service, and/or module, e.g., for request evaluation/validation. In some embodiments, the request may be received by the access and/or identity management device/service due to configuration settings of the underlying computer environment (e.g., container settings and/or automatic routing functionality). According to some embodiments, the intercepting/directing may be performed without knowledge of the user device and/or user from which the request originated. The routing/intercepting may, for example, be performed by back-end data transmission processing that is not made visible to clients/users. According to some embodiments, the access and/or identity device may utilize data from the request, such as the identifier, to query a memory and/or database storing data relating various users and/or user devices to various entitlements (e.g., access roles, credentials, and/or authorizations). The query (e.g., a first query) may identify any matching records and/or data, for example, and the access and/or identity device may receive and/or compile a listing of entitlements assigned to the user. Entitlements may comprise, for example, access rights to certain data sources and/or computer system resources (such as programs, LLM instances, API instances, computer system environments and/or applications, etc.).

According to some embodiments, the method 500 may comprise identifying (e.g., by the processing device) a subset of available LLM tools, at 506. The access and/or identity device may, for example, forward and/or provide the entitlement data to a first or primary LLM agent of the digital delegate multi-agent LLM system. According to some embodiments, the primary LLM agent may utilize the entitlement data (and/or the identifier) to query a memory and/or database storing data relating various entitlements (e.g., access roles, credentials, and/or authorizations) to various secondary LLM instances and/or computer system resources, such as data sources (collectively and generally referred to as "LLM tools"). The query (e.g., a second query) may identify any matching records and/or data, for example, and the primary LLM agent may receive and/or compile a listing of available LLM tools available to the user (e.g., based on the identity of the user and the stored entitlements assigned to the user). In some embodiments, the listing of LLM tools corresponding to the user entitlements may comprise a subset of an entire and larger set of available LLM tools. The user, for example, may only have access to a portion of available LLM tools, e.g., based on their role and/or position in a company/organization.

In some embodiments, the method 500 may comprise generating (e.g., by the processing device and/or a primary LLM) a multi-tier plan defining a plurality of actions, at 508. The primary LLM agent may, for example, be programmed to perform two (2) primary functions: (i) identify the subset of available LLM tools (e.g., at 506) and (ii) invoke the primary LLM to analyze the user request/prompt. According to some embodiments, the primary LLM agent may provide a listing of the subset of available LLM tools (e.g., secondary LLM instances and/or agents thereof) and the prompt as inputs to the primary LLM. The primary LLM may be specially trained and/or programmed, in some embodiments, to parse complex prompts by identifying and/or categorizing portions of the prompt, defining and/or determining an action and/or task required to resolve each portion of the prompt, and identifying and/or selecting at least one of the LLM tools from the subset of available LLM tools to accomplish the task/action. In some embodiments, the primary LLM may develop the multi-tier plan by defining and/or selecting the plurality of actions determined to be necessary to respond to the prompt and by assigning at least one LLM that the user has access to, to each of the actions. According to some embodiments, the selection of the LLM tools and/or assignment of LLM instances to actions may take into account (e.g., be at least partially based on) details/characteristics of the LLM tools. LLM tools/secondary LLM instances may, for example, have different levels of measured historical performance, require different costs to invoke (e.g., monetary, processing power, memory storage, and/or bandwidths costs), and/or have different current levels of utilization/traffic. Any or all of these (and other) characteristics may be utilized by the primary LLM to select a secondary LLM to assign to any given task/action of the plan.

According to some embodiments, the method 500 may comprise executing (e.g., by the processing device and/or the primary LLM) the multi-tier plan, at 510. The digital delegate multi-agent LLM system and/or the primary LLM/primary LLM agent may, for example, step through each action/task of the plan to resolve each sub-part of the prompt. In some embodiments, the method 500 and/or the executing may comprise calling (e.g., by the processing device and/or the primary LLM) a secondary LLM agent, at 512. For any given action/task of the plan, for example, the digital delegate multi-agent LLM system and/or the primary LLM/primary LLM agent may generate and transmit a call or command that is sent to a specific secondary LLM agent assigned to the task/action. In some embodiments, the plan may be developed to include and/or the digital delegate multi-agent LLM system and/or the primary LLM/primary LLM agent may provide, any inputs necessary (e.g., default required inputs) for a particular secondary LLM associated with the secondary LLM agent, to function. In some embodiments, the particular secondary LLM agent (and/or LLM thereof) may receive the call, command, and/or inputs and may operate in accordance with specially trained and/or programmed instructions thereof to derive, compute, and/or calculate a resolution and/or response for the particular task/action for the particular portion of the prompt (e.g., a sub-response, in relation to the overall prompt).

According to some embodiments, the method 500 and/or the executing may comprise receiving (e.g., by the processing device and/or the primary LLM) a response from the secondary LLM agent, at 514. The sub-response and/or result from an execution of the secondary LLM may be transmitted from the secondary LLM agent back to the digital delegate multi-agent LLM system and/or the primary LLM/primary LLM agent in response to the call, for example, such that the particular action/task is resolved by the action/execution of the secondary LLM. In some embodiments, the method 500 and/or the executing may comprise determining (e.g., by the processing device and/or the primary LLM) whether additional secondary LLM agents (and/or secondary LLM instances) need to be called, at 516. A listing of available, active, and/or assigned (e.g., based on the multi-tier plan) secondary LLM agents may be consulted, for example, to identify any secondary LLM agents that have not yet been called (and/or for which a response has not yet been acquired). In the case that not all secondary LLM agents have been called and/or utilized, the method 500 may continue to and/or loop back to call one or more additional secondary LLM agents, at 512.

According to some embodiments, such as in the case that it is determined (e.g., at 516) that all secondary LLM agents have been called and/or utilized, the method 500 may comprise constructing (e.g., by the processing device and/or the primary LLM) a user response, at 518. The primary LLM and/or primary LLM agent may, for example, utilize all received/acquired sub-responses and/or task/action resolutions and/or results to compute and/or derive an overall response to the entire user request/prompt. In some embodiments, such as in the case that the some of the sub-responses comprise data elements (e.g., numbers, graphs, etc.), such data may be inserted into and/or referenced by textual description generated by the primary LLM. According to some embodiments, the user response may comprise generative text and/or multimedia elements that are based on and/or represent the results/resolutions of each task/action identified by the multi-tier plan. In such a manner, for example, each portion of the prompt may be individually responded to along with all other portions, defining an overall user response that addresses each of the multiple portions of the original (e.g., complex) prompt.

In some embodiments, the method 500 and/or the executing may comprise transmitting the user response, at 520. The transmitting may comprise, for example, forwarding or outputting (e.g., by the processing device, via the electronic communication network, and/or to the remote user device and/or interface) the user response. The digital delegate multi-agent LLM system and/or the primary LLM/primary LLM agent may cause the combined/overall user response to be output via a GUI of the user device, for example, e.g., in response to the original receiving of the user request (e.g., prompt and identifier), at 502. In some embodiments, the user request may be entered by the user into the interface and the user response may be output in response to the request via the same interface. In such a manner, for example, the communication between the user and the digital delegate multi-agent LLM system may appear to occur seamlessly to the user. According to some embodiments, the user response may be transmitted back to the user in response to the request being submitted in a manner of seconds or minutes. A complex prompt that may be accurately responded to by invoking a plurality of differently-trained LLM instances may, for example, be responded to in a very short amount of time. In some embodiments, hundreds or thousands of user requests and corresponding responses may be processed by the digital delegate multi-agent LLM system simultaneously.

In some embodiments, any transmissions that are sent and/or received between the various devices that may be utilized by the digital delegate multi-agent LLM system may be secured via any compression and/or encryption protocols that are or become known or practicable. According to some embodiments, fewer or more devices, data storage structures, and/or process executions may be included in the method 500.

IV. Digital Delegate Multi-Agent LLM Apparatus, Articles of Manufacture, and Algorithms Turning to FIG. 6, a block diagram of an apparatus 610 according to some embodiments is shown. In some embodiments, the apparatus 610 may be similar in configuration and/or functionality to any of the user devices 102a-n, 202, 302, 402, the identity server/security device/identity device 106, 206, 306, 406 and/or the LLM server/apparatus 110, 210, 300, 410, 610, all of FIG. 1, FIG. 2, FIG. 3, FIG. 4, and/or FIG. 6 herein. The apparatus 610 may, for example, execute, process, facilitate, and/or otherwise be associated with the methods/algorithms 400, 500, 800 of FIG. 4, FIG. 5, and/or FIG. 8 herein, and/or portions or combinations thereof. In some embodiments, the apparatus 610 may comprise a processing device 612, a transceiver device 614, an input device 616, an output device 618, an interface 620, a memory device 640 (storing various programs and/or instructions 642-1, 642-2, 642-3, 642-4 and data 644-1, 644-2, 644-3, 644-4, 644-5, 644-6), and/or a cooling device 650. According to some embodiments, any or all of the components 612, 614, 616, 618, 620, 640, 642-1, 642-2, 642-3, 642-4, 644-1, 644-2, 644-3, 644-4, 644-5, 644-6, 650 of the apparatus 610 may be similar in configuration and/or functionality to any similarly named and/or numbered components described herein. Fewer or more components 612, 614, 616, 618, 620, 640, 642-1, 642-2, 642-3, 642-4, 644-1, 644-2, 644-3, 644-4, 644-5, 644-6, 650 and/or various configurations of the components 612, 614, 616, 618, 620, 640, 642-1, 642-2, 642-3, 642-4, 644-1, 644-2, 644-3, 644-4, 644-5, 644-6, 650 may be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E8501 chipset. In some embodiments, the processor 612 may comprise multiple interconnected processors, microprocessors, and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server, necessary power may be supplied via a standard AC outlet, power strip, surge protector, and/or Uninterruptible Power Supply (UPS) device.

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (not shown).

According to some embodiments, the input device 616 and/or the output device 618 are communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., by a programmer to configure and/or train multiple and/or multi-tier LLM instances, as utilized herein). The output device 618 may, according to some embodiments, comprise a display screen and/or other practicable output component and/or device. The output device 618 may, for example, provide an interface (such as the interface 620) via which a digital delegate multi-agent LLM system is provided and/or facilitated. According to some embodiments, the input device 616 and/or the output device 618 may comprise and/or be embodied in a single device, such as a touch-screen monitor.

The memory device 640 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of entitlement instructions 642-1, primary LLM instructions 642-2, secondary LLM instructions 642-3, interface instructions 642-4, entitlement data 644-1, LLM tools data 644-2, user data 644-3, company data 644-4, primary LLM model data 644-5, and/or secondary LLM model data 644-6. In some embodiments, the entitlement instructions 642-1, primary LLM instructions 642-2, secondary LLM instructions 642-3, interface instructions 642-4, entitlement data 644-1, LLM tools data 644-2, user data 644-3, company data 644-4, primary LLM model data 644-5, and/or secondary LLM model data 644-6 may be utilized by the processor 612 to provide output information via the output device 618 and/or the transceiver device 614.

According to some embodiments, the entitlement instructions 642-1 may be operable to cause the processor 612 to process the entitlement data 644-1, LLM tools data 644-2, user data 644-3, company data 644-4, primary LLM model data 644-5, and/or secondary LLM model data 644-6 in accordance with embodiments as described herein. Entitlement data 644-1, LLM tools data 644-2, user data 644-3, company data 644-4, primary LLM model data 644-5, and/or secondary LLM model data 644-6 received via the input device 616 and/or the transceiver device 614 may, for example, be analyzed, sorted, filtered, decoded, decompressed, ranked, scored, plotted, and/or otherwise processed by the processor 612 in accordance with the entitlement instructions 642-1. In some embodiments, entitlement data 644-1, LLM tools data 644-2, user data 644-3, company data 644-4, primary LLM model data 644-5, and/or secondary LLM model data 644-6 may be fed by the processor 612 through one or more mathematical and/or statistical formulas and/or models in accordance with the entitlement instructions 642-1 to automatically identify user entitlements, authorizations, credentials, access codes, roles, etc., as described herein.

In some embodiments, the primary LLM instructions 642-2 may be operable to cause the processor 612 to process the entitlement data 644-1, LLM tools data 644-2, user data 644-3, company data 644-4, primary LLM model data 644-5, and/or secondary LLM model data 644-6 in accordance with embodiments as described herein. Entitlement data 644-1, LLM tools data 644-2, user data 644-3, company data 644-4, primary LLM model data 644-5, and/or secondary LLM model data 644-6 received via the input device 616 and/or the transceiver device 614 may, for example, be analyzed, sorted, filtered, decoded, decompressed, ranked, scored, plotted, and/or otherwise processed by the processor 612 in accordance with the primary LLM instructions 642-2. In some embodiments, entitlement data 644-1, LLM tools data 644-2, user data 644-3, company data 644-4, primary LLM model data 644-5, and/or secondary LLM model data 644-6 may be fed by the processor 612 through one or more mathematical and/or statistical formulas and/or AI models (e.g., a first LLM instance) in accordance with the primary LLM instructions 642-2 to evaluate a user request/prompt (e.g., a complex prompt), generate a multi-tier response plan (e.g., defining a plurality of actions), execute the multi-tier response plan (e.g., by calling a plurality of secondary LLM instances), and/or construct a user response, as described herein.

According to some embodiments, the secondary LLM instructions 642-3 may be operable to cause the processor 612 to process the entitlement data 644-1, LLM tools data 644-2, user data 644-3, company data 644-4, primary LLM model data 644-5, and/or secondary LLM model data 644-6 in accordance with embodiments as described herein. Entitlement data 644-1, LLM tools data 644-2, user data 644-3, company data 644-4, primary LLM model data 644-5, and/or secondary LLM model data 644-6 received via the input device 616 and/or the transceiver device 614 may, for example, be analyzed, sorted, filtered, decoded, decompressed, ranked, scored, plotted, and/or otherwise processed by the processor 612 in accordance with the secondary LLM instructions 642-3. In some embodiments, entitlement data 644-1, LLM tools data 644-2, user data 644-3, company data 644-4, primary LLM model data 644-5, and/or secondary LLM model data 644-6 may be fed by the processor 612 through one or more mathematical and/or statistical formulas and/or AI models (e.g., one or more second LLM instances) in accordance with the secondary LLM instructions 642-3 to evaluate a portion of the user request/prompt (e.g., a complex prompt), generate a sub-response by executing at least one of the plurality of actions of the multi-tier response plan, and/or provide the sub-response/action resolution to the primary LLM (e.g., agent), as described herein.

In some embodiments, the interface instructions 642-4 may be operable to cause the processor 612 to process the entitlement data 644-1, LLM tools data 644-2, user data 644-3, company data 644-4, primary LLM model data 644-5, and/or secondary LLM model data 644-6 in accordance with embodiments as described herein. Entitlement data 644-1, LLM tools data 644-2, user data 644-3, company data 644-4, primary LLM model data 644-5, and/or secondary LLM model data 644-6 received via the input device 616 and/or the transceiver device 614 may, for example, be analyzed, sorted, filtered, decoded, decompressed, ranked, scored, plotted, and/or otherwise processed by the processor 612 in accordance with the interface instructions 642-4. In some embodiments, entitlement data 644-1, LLM tools data 644-2, user data 644-3, company data 644-4, primary LLM model data 644-5, and/or secondary LLM model data 644-6 may be fed by the processor 612 through one or more mathematical and/or statistical formulas and/or models in accordance with the interface instructions 642-4 to generate and/or provide interfaces and/or interface elements for submitting and/or receiving multi-tier (e.g., complex) AI prompts and/or requests (and/or responses thereto), as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740*a-e* according to some embodiments are shown. The data storage devices 740*a-e* may, for example, be utilized to store instructions and/or data, such as the entitlement instructions 642-1, primary LLM instructions 642-2, secondary LLM instructions 642-3, interface instructions 642-4, entitlement data 644-1, LLM tools data 644-2, user data 644-3, company data 644-4, primary LLM model data 644-5, and/or secondary LLM model data 644-6, each of which is presented in reference to FIG. 6 herein. In some embodiments, instructions stored on the data storage devices 740*a-e* may, when executed by a processor, cause the implementation of and/or facilitate the methods/algorithms 400, 500, 800 of FIG. 4, FIG. 5, and/or FIG. 8 herein, and/or portions or combinations thereof.

According to some embodiments, the first data storage device 740*a* may comprise one or more various types of internal and/or external hard drives. The first data storage device 740*a* may, for example, comprise a data storage medium 746 that is read, interrogated, and/or otherwise communicatively coupled to and/or via a disk reading device 748. In some embodiments, the first data storage device 740*a* and/or the data storage medium 746 may be configured to store information utilizing one or more magnetic, inductive, and/or optical means (e.g., magnetic, inductive, and/or optical-encoding). The data storage medium 746, depicted as a first data storage medium 746*a* for example (e.g., breakout cross-section "A"), may comprise one or more of a polymer layer 746*a*-1, a magnetic data storage layer 746*a*-2, a non-magnetic layer 746*a*-3, a magnetic base layer 746*a*-4, a contact layer 746*a*-5, and/or a substrate layer 746*a*-6. According to some embodiments, a magnetic read head 748*a* may be coupled and/or disposed to read data from the magnetic data storage layer 746*a*-2.

In some embodiments, the data storage medium 746, depicted as a second data storage medium 746*b* for example (e.g., breakout cross-section "B"), may comprise a plurality of data points 746*b*-2 disposed with the second data storage medium 746*b*. The data points 746*b*-2 may, in some embodiments, be read and/or otherwise interfaced with via a laser-enabled read head 748*b* disposed and/or coupled to direct a laser beam through the second data storage medium 746*b*.

In some embodiments, the second data storage device 740*b* may comprise a CD, CD-ROM, DVD, Blu-Ray™ Disc, and/or other type of optically-encoded disk and/or other storage medium that is or becomes know or practicable. In some embodiments, the third data storage device 740*c* may comprise a USB keyfob, dongle, and/or other type of flash memory data storage device that is or becomes know or practicable. In some embodiments, the fourth data storage device 740*d* may comprise RAM of any type, quantity, and/or configuration that is or becomes practicable and/or desirable. In some embodiments, the fourth data storage device 740*d* may comprise an off-chip cache, such as a Level 2 (L2) cache memory device. According to some embodiments, the fifth data storage device 740*e* may comprise an on-chip memory device, such as a Level 1 (L1) cache memory device.

The data storage devices 740*a-e* may generally store program instructions, code, and/or modules that, when executed by a processing device cause a particular machine to function in accordance with one or more embodiments described herein. The data storage devices 740*a-e* depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

Figure 8:
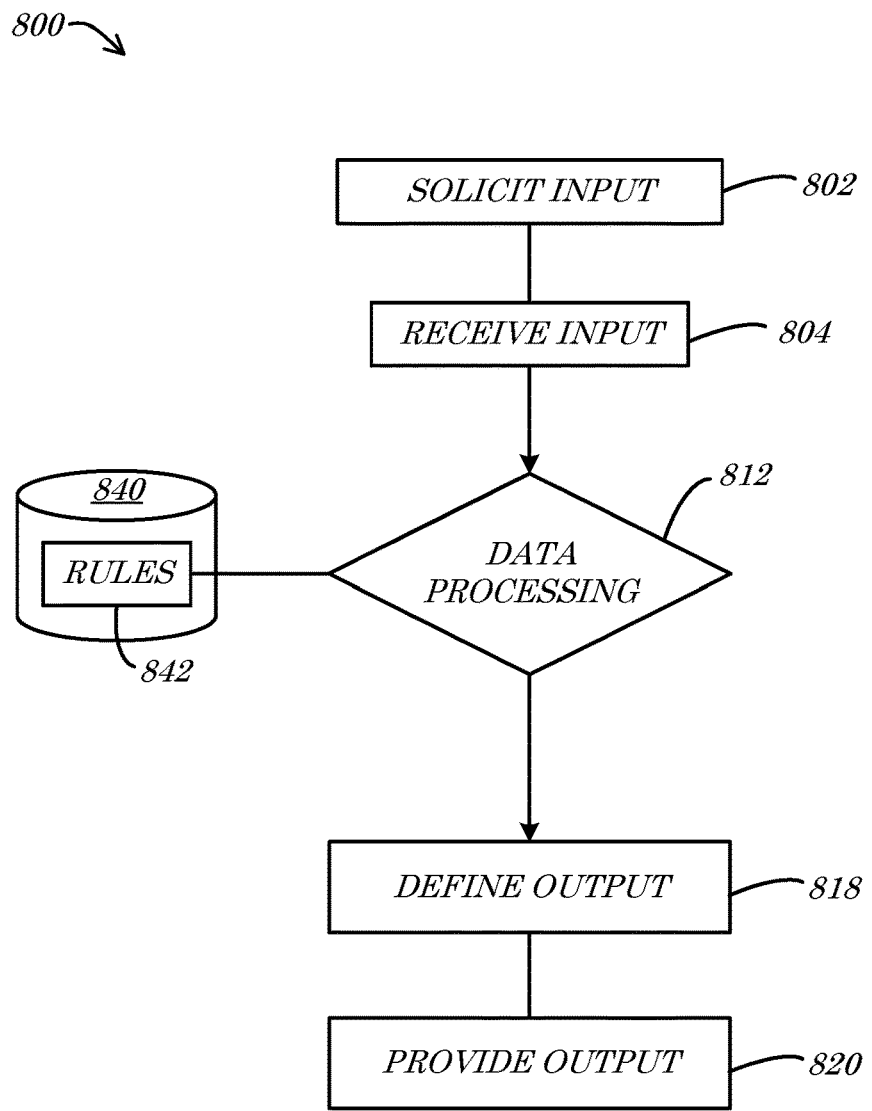
FIG. 8 is a flow diagram of an algorithm according to some embodiments.

With reference to FIG. 8, for example, the data storage devices 740*a-e* may store and/or define an algorithm 800. The algorithm 800 may comprise, for example, one or more software programs, modules, engines, models (e.g., AI models), and/or applications coded to perform any of the methods/algorithms 400, 500 of FIG. 4 and/or FIG. 5 herein, and/or portions or combinations thereof. The algorithm 800, and any reference to the term "algorithm" herein, refers to any set of defined instructions and/or trained instructions, guidelines, and/or prompt sets that operate upon input to define and/or provide output. The algorithm 800 may, for example, be specifically programmed, trained, and/or otherwise defined to instruct a computer or other device (not shown) to solve a particular problem (e.g., logical) and/or resolve a particular mathematical calculation (e.g., arithmetic). In some embodiments, the algorithm 800 may be written and/or defined as a series or sequence of instructions, guidelines, formulas, thresholds, rules, and/or prompts encoded in (e.g., written in accordance with syntax and/or semantics rules) a particular computer programming language (e.g., Python™, Java™, JavaScript™, C, C++, C#, Basic™, FORTRAN, COBOL, Ruby™, and/or Perl™), e.g., a set of instructions that convert and/or encode characters, objects, and/or other data elements into machine code (e.g., code operable to be executed by an electronic processing device, such as a Central Processing Unit (CPU)).

According to some embodiments, the algorithm 800 may comprise soliciting input, at 802. Input from one or more sources may be searched for and/or queried, by structuring and/or executing a database query and/or by sending a data communication signal or "handshake", such as is common with Bluetooth® short-range communication protocols. In some embodiments, the algorithm 800 may comprise receiving the input, at 804. Whether solicited or otherwise provided and/or acquired (e.g., loaded and/or downloaded), for example, the input for the algorithm 800 may be received, identified, and/or otherwise processed and/or located. According to some embodiments, the algorithm 800 may comprise data processing, at 812. The data processing may, for example, comprise execution of one or more logical and/or computational procedures, modules, scripts, models, and/or routines that may be stored in a memory device 840 (e.g., similar to the data storage devices 740*a-e*) as a set of instructions or rules 842 and/or that may be defined and/or implemented by one or more electrical, mechanical, and/or physical components, such as logic gates, diodes, transistors, relays, and/or switches (e.g., operable to execute any of the methods/algorithms 400, 500 of FIG. 4 and/or FIG. 5 herein, and/or portions or combinations thereof).

In some embodiments, execution of the algorithm 800 may comprise a loading of the rules 842 into the memory device 840 and/or into an electronic processing system (not shown) and/or an activation of one or more logic gates and/or other electrical and/or mechanical components. The algorithm 800 may operate upon the input in accordance with the rules 842 to achieve a result by defining output, at 818. The algorithm 800 may, for example, generate, produce, define, identify, calculate, and/or otherwise compute output based on an application of the data processing (at 812) utilizing the rules 842 and any or all input receiving at 804. According to some embodiments, the algorithm 800 may comprise providing the output, at 820. One or more output devices (not shown) may be utilized to convey the output (e.g., a result, conclusion, decision, etc.) to one or more other devices and/or entities (not shown), such as one or more users, consumers, customers, potential customers, and/or devices utilized thereby. The output may be displayed via an electronic display screen of a computer, mobile/smart phone, smart watch, etc., and/or may be transmitted as one or more electronic signals to one or more network destination addresses, such as email addresses, URL locations, Media Access Control (MAC) addresses, and/or broadcast radio frequencies.

According to some embodiments, the data processing at 812 may comprise execution of a listing, sequence, matrix, and/or other set of stored steps and/or instructions that utilize the input to define the output (e.g., a multi-tier plan as described herein). In some embodiments, the listing of steps and/or instruction details may comprise elements that are known to those skilled in the art. The algorithm 800 may partially or completely comprise, for example, instructions and/or steps that are well known, such as steps and/or instructions operable to calculate an area (length times width), volume (length times width times height), distance (difference between two locations), velocity (distance over time), acceleration (velocity over time), and/or any other known mathematical and/or logical (if/then statements) procedures. For any and all known procedures and/or instructions, the discrete details of such instructions are represented by the data processing at 812 and are not listed herein as one of ordinary skill in the art would readily comprehend both what such technological knowledge entails and that the inventor has possession of such knowledge. Instructions that may be included within and/or comprise the data processing at 812 (and/or the algorithm 800) may include, for example, but are not limited to, any known or practicable: (i) communication protocols and/or algorithms, (ii) AI, LLM, and/ or ML data input classification algorithms, (iii) data transmission algorithms, (iv) data encoding algorithms, (v) data decoding algorithms, (vi) logical and/or mathematical data comparison algorithms, and (vii) data searching (e.g., keyword searching) algorithms.

V. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The indefinite articles "a" and "an," as used herein in the specification and in the claims, unless clearly indicated to the contrary, should be understood to mean "at least one." This rule applies even within the body of a claim where a first instance of an element utilizes "a" or "an" and a second or subsequent instance of the element necessarily utilizes (e.g., for purposes of proper grammar and required antecedent basis) the definite article "the" to refer to the element. The use of the definite article "the" does not limit the element to a single object merely because it is utilized to refer back to a previous mention of the element. The original reference to the element controls with respect to the plurality (or lack thereof) of the element.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A multi-Large Language Model (LLM), multi-agent, digital delegate computer system, comprising:
   an identity server comprising at least one electronic processing device;
   a non-transitory access entitlement data store device in communication with the identity server, the access entitlement data store device storing access entitlement data in relation to user identification data;
   a multi-agent LLM server comprising a plurality of electronic processing devices and being in communication with the identity server; and
   a non-transitory LLM data store device in communication with the multi-agent LLM server, the LLM data store device storing (i) instructions defining a primary LLM agent, (ii) instructions defining a primary LLM; (iii) data descriptive of a plurality of LLM tools, (iv) instructions defining, for each LLM tool of the plurality of LLM tools, a secondary LLM agent, and (v) operating instructions, that when executed by the plurality of electronic processing devices, result in:
      receiving, by the multi-agent LLM server and from a user device, a user request comprising a prompt and an indication of an identifier of a user of the user device;
      identifying, by the identity server and utilizing the identifier of the user to query the access entitlement data store, at least one access entitlement assigned to the user;
      identifying, by an execution of the primary LLM agent by the multi-agent LLM server, and based on the at least one access entitlement assigned to the user, and by querying the data descriptive of the plurality of LLM tools, a subset of LLM tools from the plurality of LLM tools that the user is entitled access to;
      generating, by the primary LLM and utilizing both the prompt and the identified subset of LLM tools from the plurality of LLM tools that the user is entitled access to, and after the identification of the subset of LLM tools from the plurality of LLM tools that the user is entitled access to, a multi-tier plan for responding to the user request, wherein the multi-tier plan defines a plurality of actions, with each action being assigned to one of the LLM tools from the identified subset of LLM tools;
      executing, by the primary LLM agent, the multi-tier plan, by:
         (i) calling a secondary LLM agent assigned to each respective one of the LLM tools from the identified subset of tools for the plurality of actions of the multi-tier plan; and
         (ii) receiving, from each secondary LLM agent and in response to the calling, a response for each of the actions of the multi-tier plan;
      constructing, by the primary LLM agent and utilizing the responses for the actions of the multi-tier plan, a user response; and
      transmitting, by the primary LLM agent and to the user device, the user response.

2. The multi-LLM, multi-agent, digital delegate computer system of claim 1, wherein the execution by the plurality of electronic processing devices further results in:
   transmitting, by the multi-agent LLM server and to the identity server, the identifier of the user; and
   wherein the identifying of the at least one access entitlement assigned to the user is conducted in response to the transmitting of the identifier of the user by the multi-agent LLM server.

3. The multi-LLM, multi-agent, digital delegate computer system of claim 1, wherein the at least one access entitlement assigned to the user comprises a suite of access entitlements defined by a role assigned to the user.

4. The multi-LLM, multi-agent, digital delegate computer system of claim 1, wherein each LLM tool from the subset of tools from the plurality of LLM tools that the user is entitled access to comprises a different secondary LLM.

5. The multi-LLM, multi-agent, digital delegate computer system of claim 4, wherein the execution by the plurality of electronic processing devices further results in:
   executing, in response to the calling and by each of the called secondary LLM agents, a respective secondary LLM.

6. The multi-LLM, multi-agent, digital delegate computer system of claim 1, wherein the multi-tier plan is generated as a text file.

7. The multi-LLM, multi-agent, digital delegate computer system of claim 1, wherein the generating of the multi-tier plan is based on a subset of the data descriptive of the plurality of LLM tools that corresponds to the identified subset of LLM tools from the plurality of LLM tools that the user is entitled access to.

8. The multi-LLM, multi-agent, digital delegate computer system of claim 7, wherein the subset of the data that corresponds to the identified subset of LLM tools from the plurality of LLM tools that the user is entitled access to comprises at least one of: (i) a cost of each LLM tool, (ii) a bandwidth of each LLM tool, (iii) a rating of each LLM tool, and (iv) a historic performance metric of each LLM tool.

9. The multi-LLM, multi-agent, digital delegate computer system of claim 1, wherein each action of the plurality of actions of the multi-tier plan is defined by the primary LLM based on a different goal derived by the primary LLM from the prompt.

10. The multi-LLM, multi-agent, digital delegate computer system of claim 9, wherein each LLM tool assigned to each action of the plurality of actions of the multi-tier plan is selected by the primary LLM based on a stored indication of an ability of each LLM tool to handle the respective assigned action.

11. The multi-LLM, multi-agent, digital delegate computer system of claim 10, wherein the stored indication of the ability of each LLM tool to handle the respective assigned action is derived from previous performance data for the respective LLM tool.

12. The multi-LLM, multi-agent, digital delegate computer system of claim 10, wherein the stored indication of the ability of each LLM tool to handle the respective assigned action comprises at least one of a score and a ranking.

13. The multi-LLM, multi-agent, digital delegate computer system of claim 1, wherein the user response is utilized to update at least a portion of the data descriptive of a plurality of LLM tools stored in the non-transitory LLM data store device.

14. The multi-LLM, multi-agent, digital delegate computer system of claim 1, wherein the responses for the actions of the multi-tier plan are utilized to update at least a portion of the data descriptive of a plurality of LLM tools stored in the non-transitory LLM data store device.

* * * * *